(12) United States Patent
Arias

(10) Patent No.: US 7,082,883 B1
(45) Date of Patent: Aug. 1, 2006

(54) COLLAPSIBLE PROTECTIVE COVER

(75) Inventor: David A. Arias, Virginia Beach, VA (US)

(73) Assignee: Swimways Corp., Virginia Beach, VA (US)

( * ) Notice: Subject to any disclaimer, the term of this patent is extended or adjusted under 35 U.S.C. 154(b) by 148 days.

(21) Appl. No.: 10/696,262

(22) Filed: Oct. 29, 2003

(51) Int. Cl.
*A47B 13/08* (2006.01)

(52) U.S. Cl. .................................................. 108/90
(58) Field of Classification Search ............... 108/90; 135/125, 126, 128, 143; 150/158
See application file for complete search history.

(56) References Cited

U.S. PATENT DOCUMENTS

| | | | | |
|---|---|---|---|---|
| 3,279,515 | A | * | 10/1966 | Kesh ........................... 108/90 |
| 3,295,577 | A | * | 1/1967 | Danielson ................... 108/90 |
| 3,368,601 | A | * | 2/1968 | Gantert-Merz .............. 108/90 |
| 4,750,402 | A | * | 6/1988 | Markey ....................... 108/90 |
| 5,339,748 | A | * | 8/1994 | Bilotti ......................... 108/90 |
| 5,582,115 | A | * | 12/1996 | Muller ........................ 108/90 |
| 5,845,697 | A | | 12/1998 | Zheng |
| 5,908,681 | A | * | 6/1999 | Foster ......................... 108/90 |
| D425,357 | S | | 5/2000 | Waring |
| 6,073,283 | A | | 6/2000 | Zheng |
| 6,088,953 | A | | 7/2000 | Morgan |
| 6,170,100 | B1 | | 1/2001 | Le Gette et al. |
| 6,192,635 | B1 | | 2/2001 | Zheng |
| 6,205,936 | B1 | * | 3/2001 | Nelson et al. ............... 108/90 |
| 6,343,391 | B1 | | 2/2002 | Le Gette et al. |
| 6,457,423 | B1 | * | 10/2002 | Gordon ....................... 108/90 |
| 6,478,038 | B1 | | 11/2002 | Le Gette et al. |
| 6,485,344 | B1 | | 11/2002 | Arias |
| 6,519,793 | B1 | | 2/2003 | Le Gette et al. |
| 6,575,185 | B1 | | 6/2003 | Zheng |
| 6,595,227 | B1 | | 7/2003 | Le Gette et al. |

OTHER PUBLICATIONS

International Search Report for International Patent Application No. PCT/US04/34336, 2 pages.

* cited by examiner

*Primary Examiner*—Jose V. Chen

(57) ABSTRACT

A collapsible cover that includes a flexible panel having a top side and a bottom side, a perimeter pocket formed substantially around a perimeter of the flexible panel, a coilable frame member held or contained within the perimeter pocket, wherein the coilable frame member is capable of being manipulated between an expanded configuration and a collapsed configuration, and a flexible skirt attached substantially along a perimeter of the flexible panel, wherein the flexible skirt extends generally toward the center of the collapsible cover, such that when the collapsible cover is placed over an item, the flexible skirt at least partially secures the collapsible cover on the item.

30 Claims, 21 Drawing Sheets

COLLAPSIBLE PROTECTIVE COVER

BACKGROUND OF THE INVENTION

Field of the Invention

This invention relates generally to protective cover devices. In particular, the present invention relates to protective cover devices that are collapsible through use of a coilable frame member.

SUMMARY OF THE INVENTION

The present invention is a collapsible protective cover device that may be used to protect a particular item or object, such as, for example, an outdoor or picnic table, a chair, a grill, a bicycle, and the like, from the elements and other substances. The collapsible protective cover is collapsible by means of a coiled spring, such that, when the collapsible protective cover is collapsed or coiled, it is of minimal size. This is accomplished by twisting and compressing the present invention into a spring-like form. In this manner, when the collapsible protective cover is not in use, it can be coiled to a minimal size and easily to stored and/or transported.

When the collapsible protective cover is opened or expanded, and the tension in the spring is released, the cover device expands to its full size. The collapsible protective cover may then placed over the top of, for example, a table and fastened by means of an elastic skirt that wraps around the lip of the table. After the collapsible protective cover is attached to the table, the table is protected from elements such rain, dirt, dust, pollen, hail, bird feces, insects, and other agents. The collapsible protective cover may also be used as a protective element from food or other human interaction much as a tablecloth would.

Accordingly, this invention provides a collapsible cover, which is easily collapsed and extended to full size through the use of mechanical means.

This invention separately provides a collapsible cover, which is easily collapsed or extended to full size through the use of a coilable frame member.

This invention separately provides a collapsible cover, which requires minimal force to twist and fold into the collapsed configuration.

This invention separately provides a collapsible cover, which is simple and cost effective.

This invention separately provides a collapsible cover for tables.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following Figs., wherein like reference numerals refer to like parts throughout the several views, and wherein.

DETAILED DESCRIPTION OF THE PREFERRED EMBODIMENT

Figure 1:
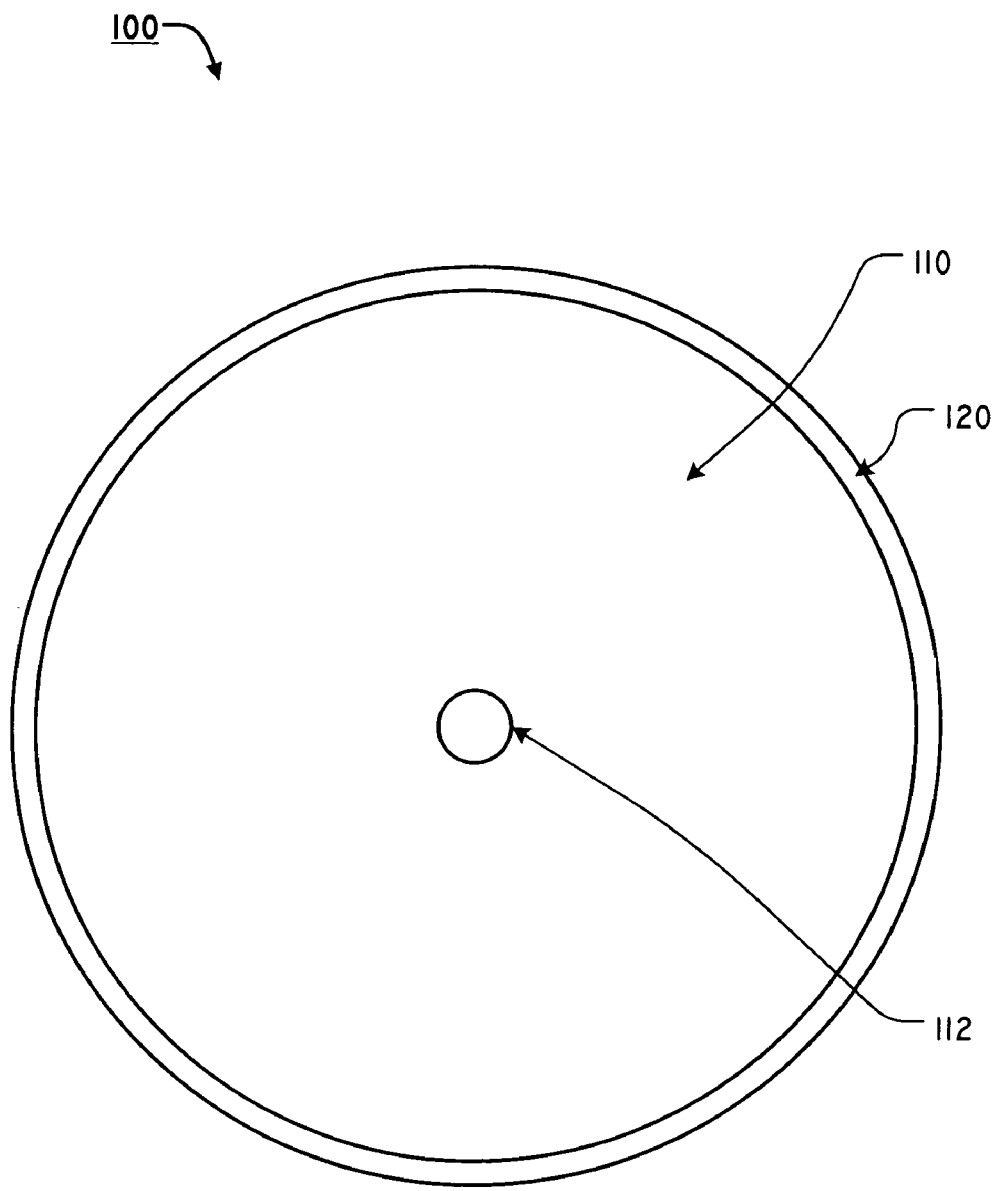
FIG. 1 shows a top view of a first exemplary embodiment of a collapsible cover according to this invention.
Figure 2:
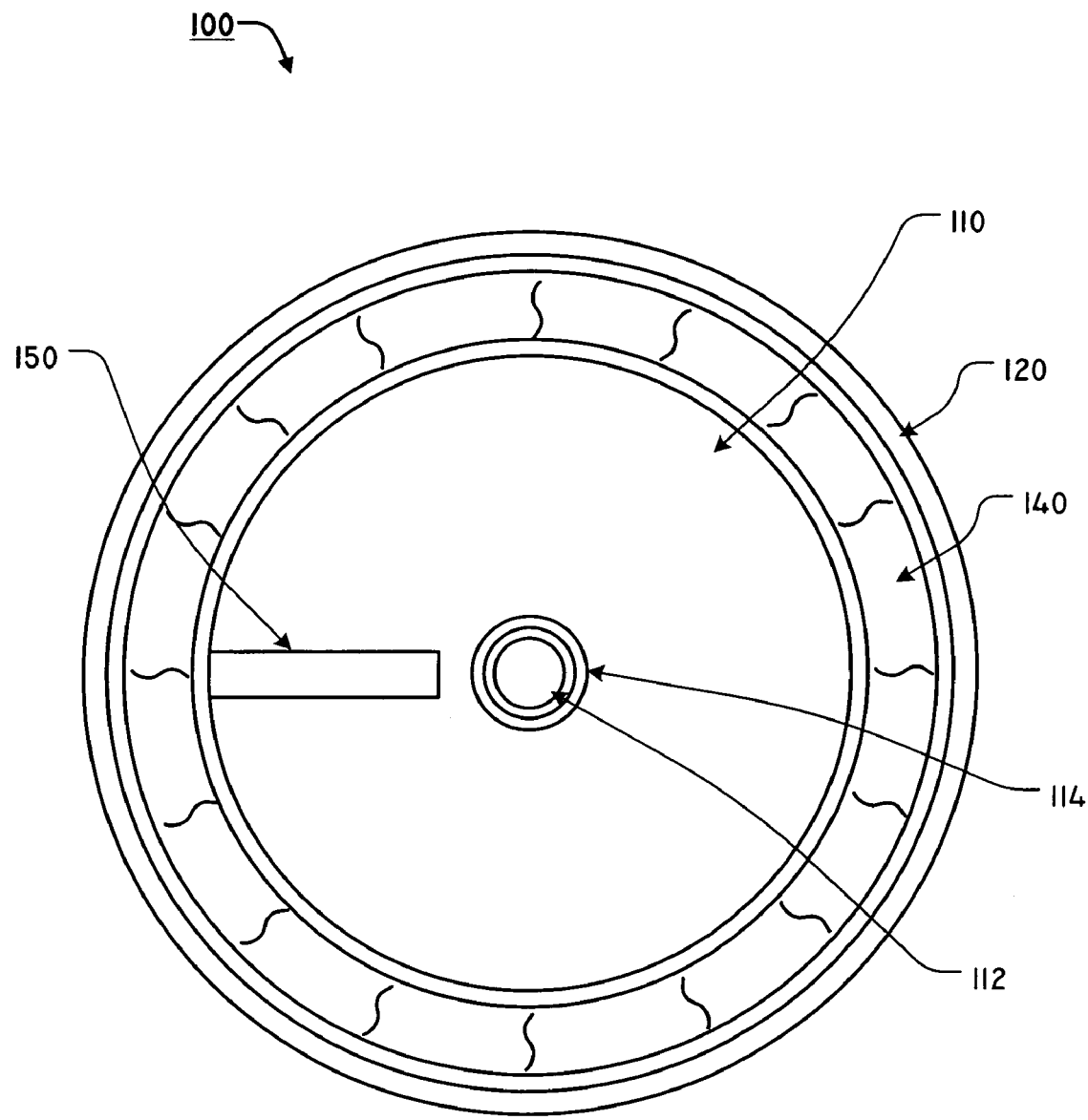
FIG. 2 shows a bottom view of the first exemplary embodiment of the collapsible cover according to this invention.
Figure 3:
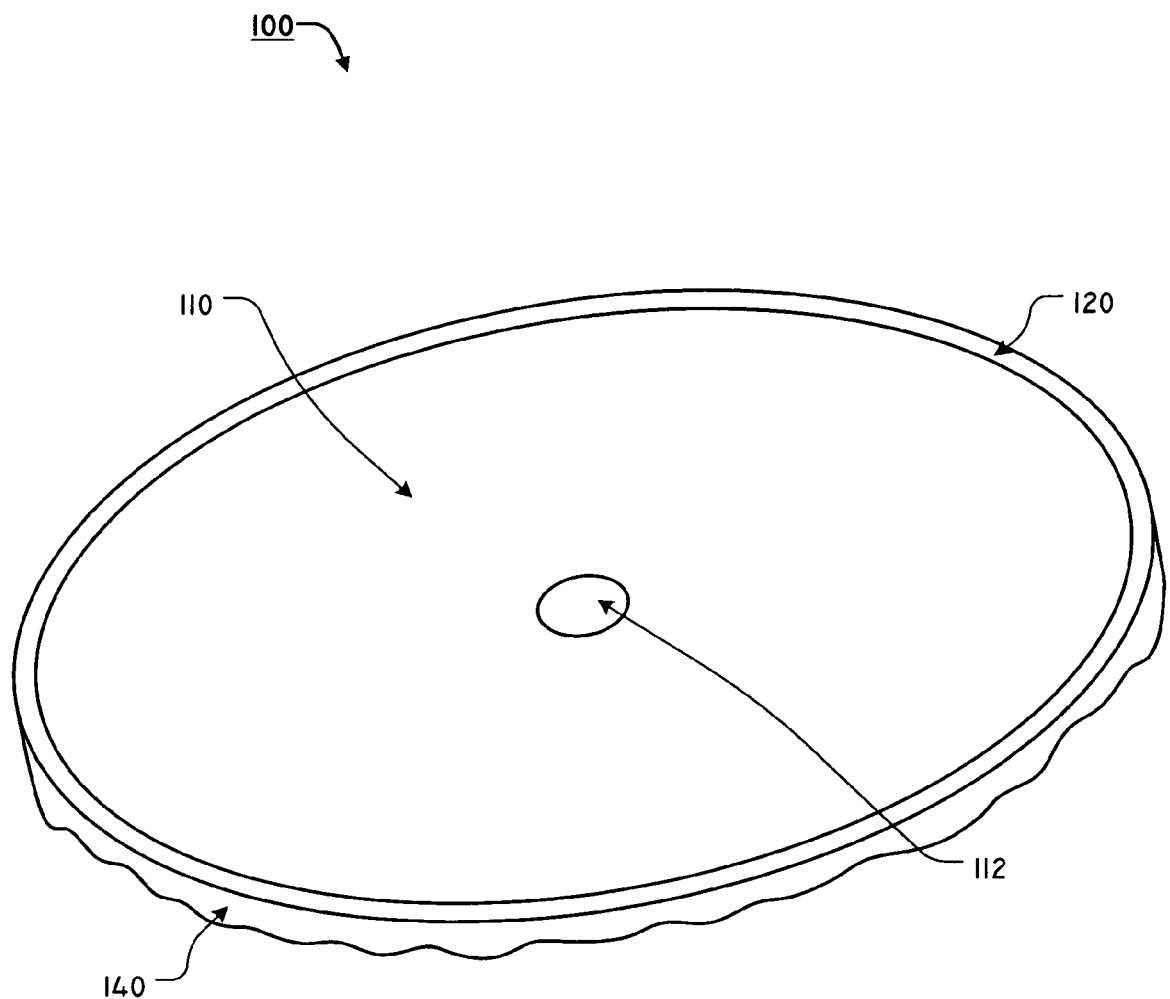
FIG. 3 shows a perspective view of a first exemplary embodiment of a collapsible cover in a fully expanded or open configuration according to this invention.
Figure 4:
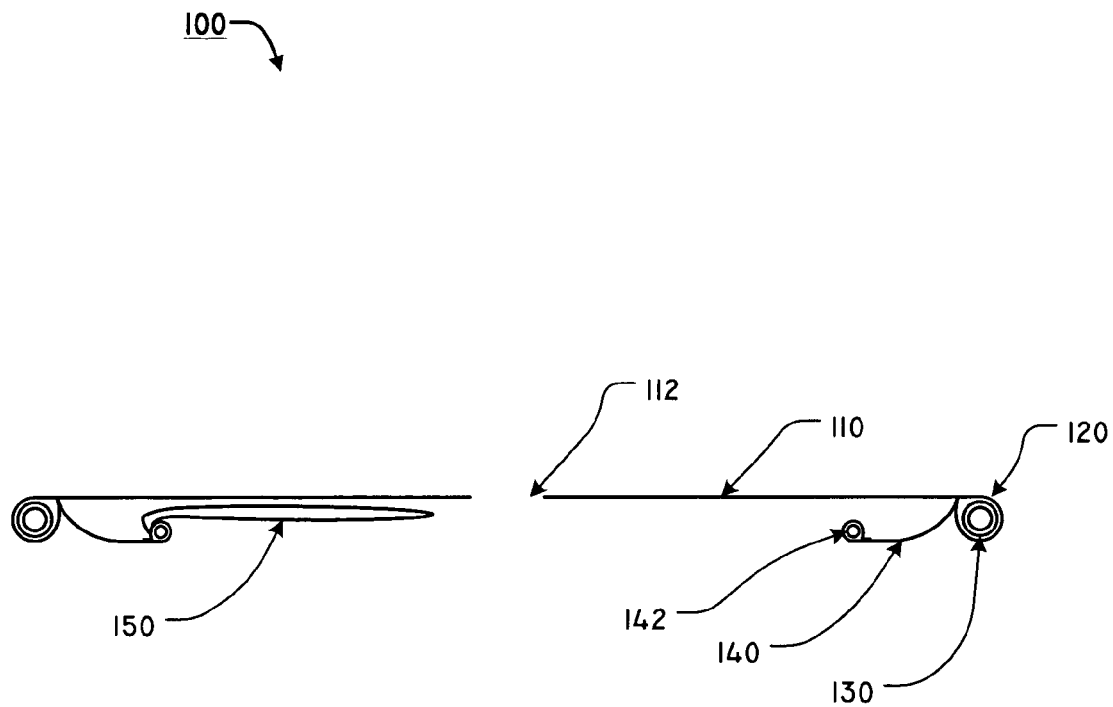
FIG. 4 shows a cross sectional view of the first exemplary embodiment of the collapsible cover according to this invention taken along a center-line of FIG. 1.

For simplicity and clarification, the design factors, construction, and layout of the collapsible protective cover devices according to this invention are explained with reference to various exemplary embodiments of a collapsible cover according to this invention. The basic explanation of the operation of the collapsible cover is applicable for the understanding and design of the constituent components employed in the collapsible covers of this invention.

Furthermore, it should be appreciated that, for simplicity and clarification, the embodiments of this invention will be described with reference to the collapsible cover being used as a collapsible protective cover for an outdoor or patio table and for an outdoor or patio chair. However, it should be appreciated that the collapsible, protective cover devices of this invention may be used to provide a protective cover for any item or object.

FIGS. 1, 2, 3, and 4 show a top, bottom, perspective, and cross sectional view, respectively, of a first exemplary embodiment of a collapsible cover 100 according to this invention. As shown in FIGS. 1–4, the collapsible cover 100 includes at least some of a flexible panel 110, a perimeter pocket 120, a hole 112, an optional hole reinforcement 114, a coilable frame member 130, a flexible skirt 140, an elastic portion 142, and an optional strap 150.

As shown in FIGS. 1–4, the flexible panel 110 includes a top side and a bottom side and is generally circular in nature. In various exemplary embodiments, the flexible panel 110 is made of strong, lightweight fabric or other material and may include woven fabrics, sheet fabrics, films, nylon, spandex, vinyl, Polyvinyl Chloride (PVC), neoprene, or the like. Additionally, the flexible panel 110 may be made of any flexible and/or elastic material and may stretch, such that the collapsible cover 100 is adaptable to different sizes and configurations and properly fits around a table top. Alternatively, the flexible panel 110 may be formed from multiple materials.

In various exemplary embodiments, the flexible panel 110 may include a cushion material, such that the collapsible cover 100 may provide an additional cushion to the item over which it is placed.

The fabric may be water-resistant and durable enough to withstand the wear and tear associated with a cover material that is appropriate for outdoor. It should be appreciated that the terms fabric and material are to be given their broadest meanings and that the particular fabric or material used to form the flexible panel 110 is a design choice based on the desired appearance and functionality of the collapsible cover 100.

A perimeter pocket 120 is formed substantially around a perimeter of the flexible panel 110 such that a coilable frame member 130 may be held or contained within the perimeter pocket 120. The coilable frame member 130 provides tension to the flexible panel 110 and holds the flexible panel 110 taut when the flexible panel 110 is in an expanded configuration and provides form to the flexible panel 110. The coilable frame member 130 may be merely held or retained within the perimeter pocket 120 without being connected thereto. Alternatively, the coilable frame member 130 may be mechanically fastened, joined, stitched, fused, or glued within the perimeter pocket 120, such that the coilable frame member 130 is retained in a specific position relative to the perimeter pocket 120 or the collapsible cover 100.

In various exemplary embodiments, the coilable frame member 130 may comprise a single unitary element. Alternatively, the coilable frame member 130 may comprise at least one strip or segment of frame member material connected to form a continuous loop, as further described in FIG. 8.

The coilable frame member 130 may be formed of for example, spring steel. Thus, the coilable frame member 130 may have a memory such that the coilable frame member 130 will expand to its uncoiled configuration when not held in the coiled configuration. In this manner, the coilable frame member 130 is capable of being manipulated between two extreme configurations or orientations, a fully expanded or open configuration, as shown, for example, in FIGS. 1–4, and a coiled or collapsed configuration, as shown, for example, in FIG. 21E.

The coilable frame member 130 may be coated with a layer of PVC to protect the coilable frame member 130 from corroding and rusting. Alternatively, the coilable frame member 130 may be formed from a coilable spring or any other material, such as, for example, plastic, fiberglass, PVC, nylon, or the like, which is relatively strong and sufficiently flexible to allow the coilable frame member 130 to be compressed and coiled. In various exemplary embodiments, the coilable frame member 130 may be formed from a waterproof or corrosion resistant material or from a material that has been treated such that it is resistant to water damage or corrosion.

A hole 112 is formed in an approximate center of the collapsible cover 100 such that, when the collapsible cover 100 is placed over a table that is capable of supporting an umbrella, the umbrella may still be supported by the table even while the collapsible cover 100 is on the table. In various exemplary embodiments, the hole 112 is surrounded by an optional hole reinforcement 114. The hole reinforcement 114, if included, allows the flexible panel 110 to be reinforced, such that it does not fray or rip in the area of the hole 112.

A flexible skirt 140 is attached along an outer edge or the perimeter of the flexible panel 110, and extends generally downward or toward the center of the collapsible cover 100. In certain exemplary embodiments, the flexible skirt 140 extends from the entire outer edge or perimeter of the flexible panel 110. In certain other exemplary embodiments, the flexible skirt 140 extends from a portion of the outer edge or perimeter of the flexible panel 110.

In various exemplary embodiments, the flexible skirt 140 is made of strong, lightweight fabric or other material and may include woven fabrics, sheet fabrics, films, nylon, spandex, vinyl, PVC, neoprene, or the like. Additionally, the flexible skirt 140 may be made of any flexible and/or elastic material and may stretch generally downward or toward the center of the collapsible cover 100. Alternatively, the flexible skirt 140 may be formed from multiple materials. In various exemplary embodiments, the flexible skirt 140 may include a cushion material.

The fabric may be water-resistant and durable enough to withstand the wear and tear associated with a cover material that is appropriate for outdoor. It should be appreciated that the terms fabric and material are to be given their broadest meanings and that the particular fabric or material used to form the flexible skirt 140 is a design choice based on the desired appearance and functionality of the collapsible cover 100.

The flexible skirt 140 is attached to the collapsible cover 100 such that when the collapsible cover 100 is placed over, for example, a table, the flexible skirt 140 wraps around the lip of the table and holds or secures the collapsible cover 100 to the table.

The flexible skirt 140 includes an elastic portion 142 that provides tension to the flexible skirt 140 and allows the flexible skirt 140 to hold or secure the collapsible cover 100 to a table.

The strap 150, if included, may be attached to the flexible panel 110, the perimeter pocket 120, or the flexible skirt 140. The strap 150 allows the collapsible cover 100 to be maintained in a folded or collapsed state, when it is folded or collapsed.

Figure 5:
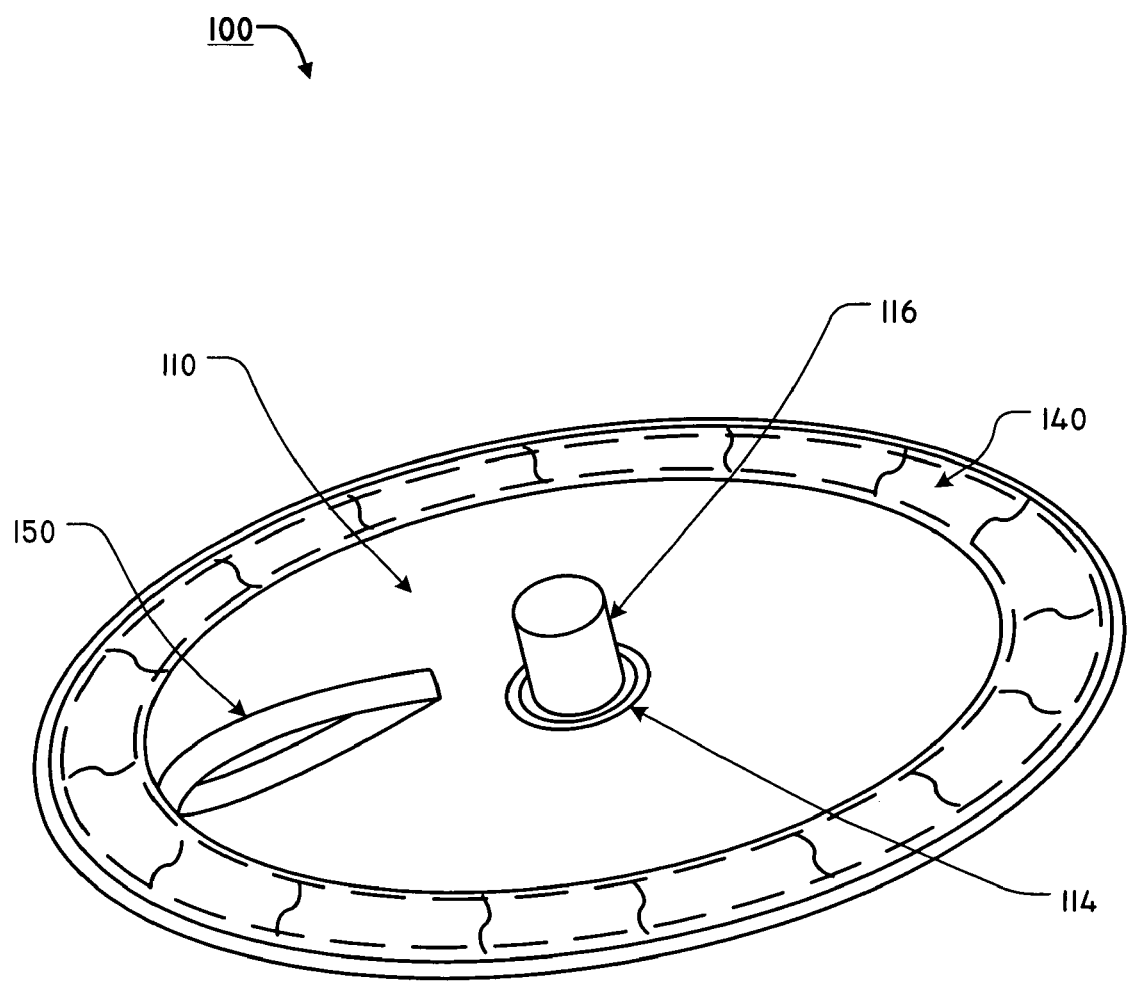
FIG. 5 shows a bottom perspective view of a second exemplary embodiment of a collapsible cover according to this invention.
Figure 6:
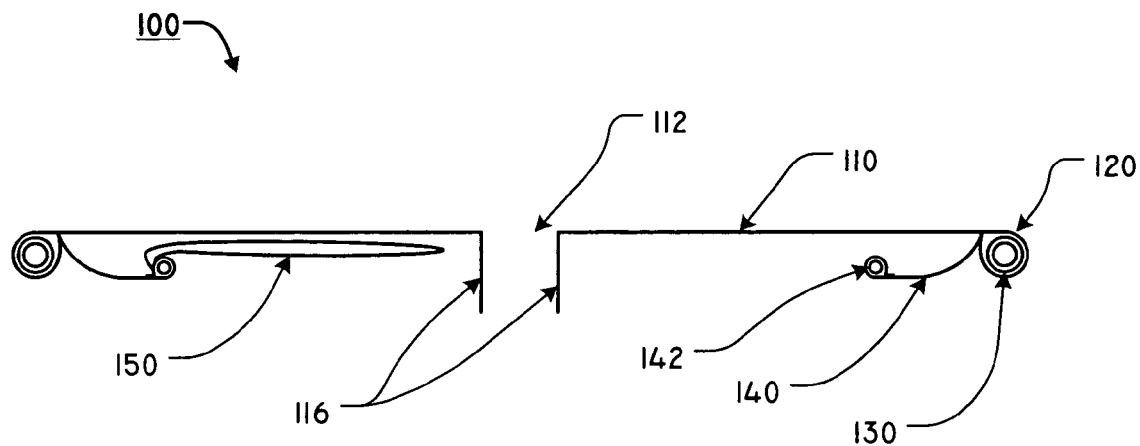
FIG. 6 shows a cross sectional view of the second exemplary embodiment of the collapsible cover according to this invention.

FIGS. 5 and 6 show a bottom perspective and a cross sectional view, respectively of a second exemplary embodiment of the collapsible cover 100 according to this invention. As shown in FIGS. 5 and 6, the collapsible cover 100 also includes a protective sleeve 116 extending from the hole 112. In this exemplary embodiment, the protective sleeve 116 provides additional coverage and protection for the portion of an umbrella pole that passes through the hole 112. Thus, dirt and debris that forms atop the flexible panel 110 does not freely flow through the hole 112, but is captured by the protective sleeve 116.

In various exemplary embodiments, the protective sleeve 116 extends generally downward from the hole 112. In other exemplary embodiments, the protective sleeve 116 extends generally upward from the hole 112.

Figure 7:
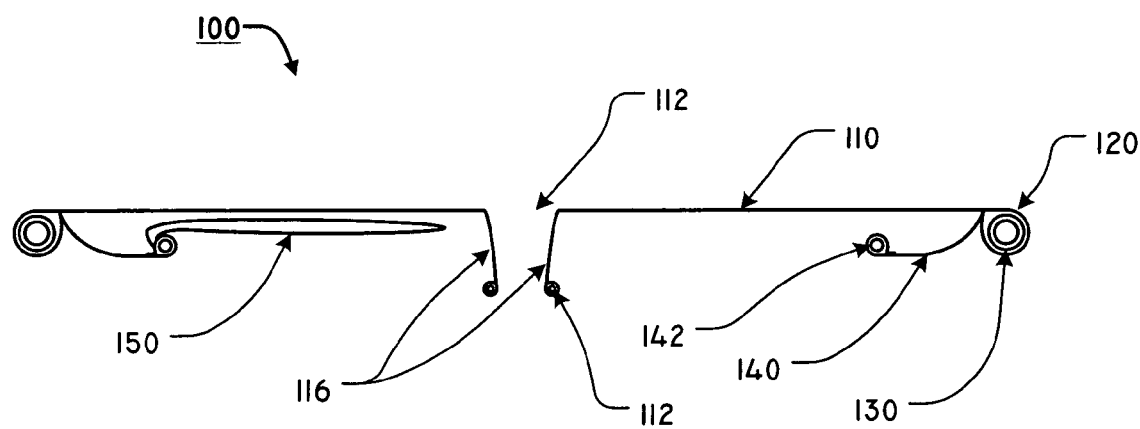
FIG. 7 shows a cross sectional view of a variation of the second exemplary embodiment of the collapsible cover according to this invention.

FIG. 7 shows a cross sectional view of a variation of the second exemplary embodiment of the collapsible cover 100 according to this invention. As shown in FIG. 7, the protective sleeve 116 includes an elastic portion 112 that provides tension to the protective sleeve 116, such that the protective sleeve 116 may be cinched or formed to the umbrella pole as it passes through the hole 112 in the protective sleeve 116.

Figure 8:
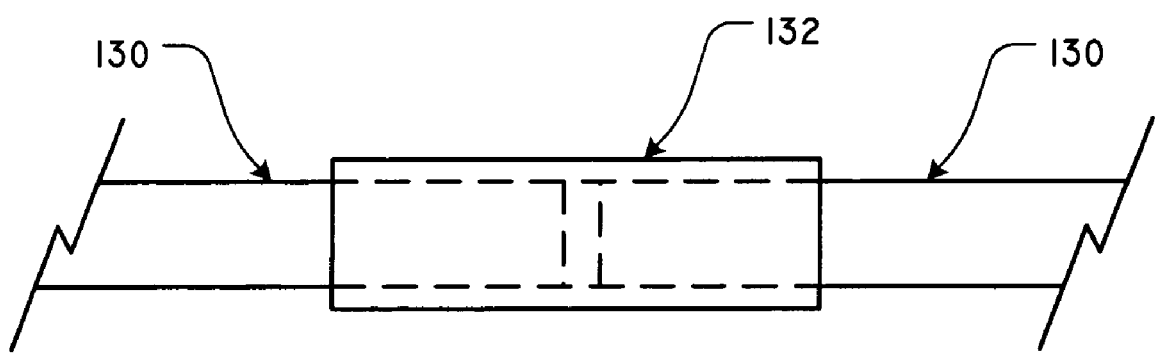
FIG. 8 shows a first exemplary embodiment of a method for joining the coilable frame member as used in one exemplary embodiment of the present invention.

FIG. 8 shows a first exemplary embodiment of a method for joining the coilable frame member 130 when the coilable frame member 130 comprises at least one strip or segment of material connected to form a continuous loop. As shown in FIG. 8, the at least one strip or segment of the coilable frame member 130 is joined by a coilable frame member joining means 132, such as, for example, a sleeve, for joining the ends of the at least one strip or segment. As shown in FIG. 8, the ends of the at least one strip or segment of the coilable frame member 130 within the joining means 132 are shown in dashed lines for clarification.

In various exemplary embodiments, the joining means 132 is a sleeve with an outer diameter not substantially greater than an outer diameter of the coilable frame member 130 and an inner diameter that is equal to or slightly smaller than the outer diameter of the coilable frame member 130. In this manner, when ends of a segment of the coilable frame member 130 are inserted into the joining means 132, they are able to be frictionally maintained within the joining means 132.

In various exemplary embodiments, the inner diameter of the joining means 132 is substantially similar to or larger than an outer diameter of the coilable frame member 130 and the end of the at least one segment of the coilable frame member 130 must be mechanically fastened, joined, stitched, fused, glued, welded, or otherwise attached or adhered within the joining means 132.

It should be appreciated that in various exemplary embodiments, the coilable frame member 130 is a continuous loop or band of material and a joining means 132 is not required. Alternatively, opposing ends of the at least one strip or segment of the coilable frame member 130 may be mechanically fastened, joined, stitched, fused, glued, welded, or otherwise attached or adhered such that the joining means 132 is not necessary.

Figure 9:
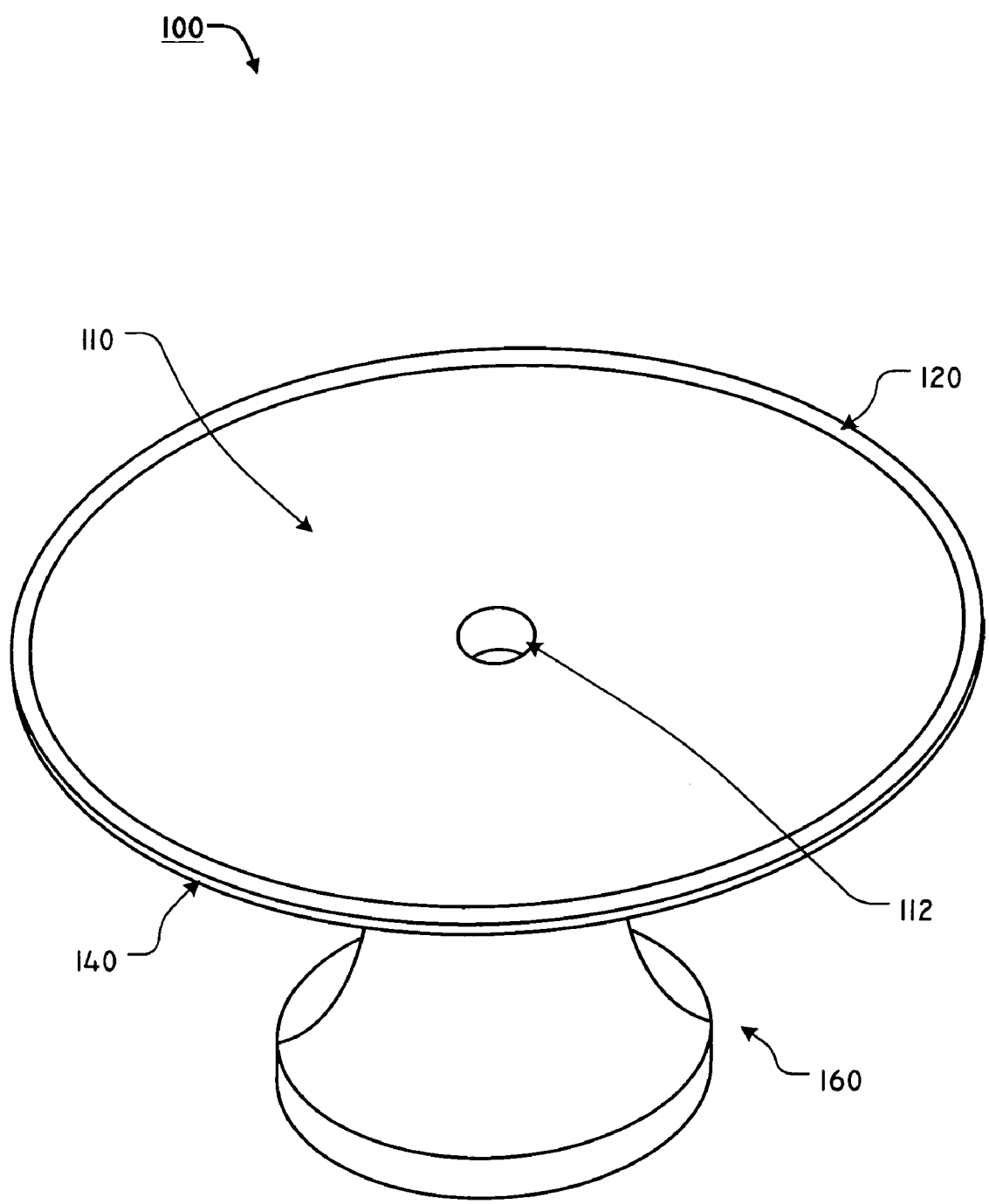
FIG. 9 shows a perspective view of a first exemplary embodiment of a collapsible cover in use on a table according to this invention.

FIG. 9 shows a perspective view of a first exemplary embodiment of the collapsible cover 100 in use on a table according to this invention. As shown in FIG. 9, the collapsible cover 100 is in a fully expanded or open configuration and is placed on the top of the table 160, such that the flexible skirt 140 wraps under the top of the table 160 and is kept in place by the elastic portion 142. As further shown in FIG. 9, the hole 112 is centered on the table such that the protective sleeve 116 may extend generally downward through a corresponding hole in an approximate center of the top of the table 160.

Figure 10:
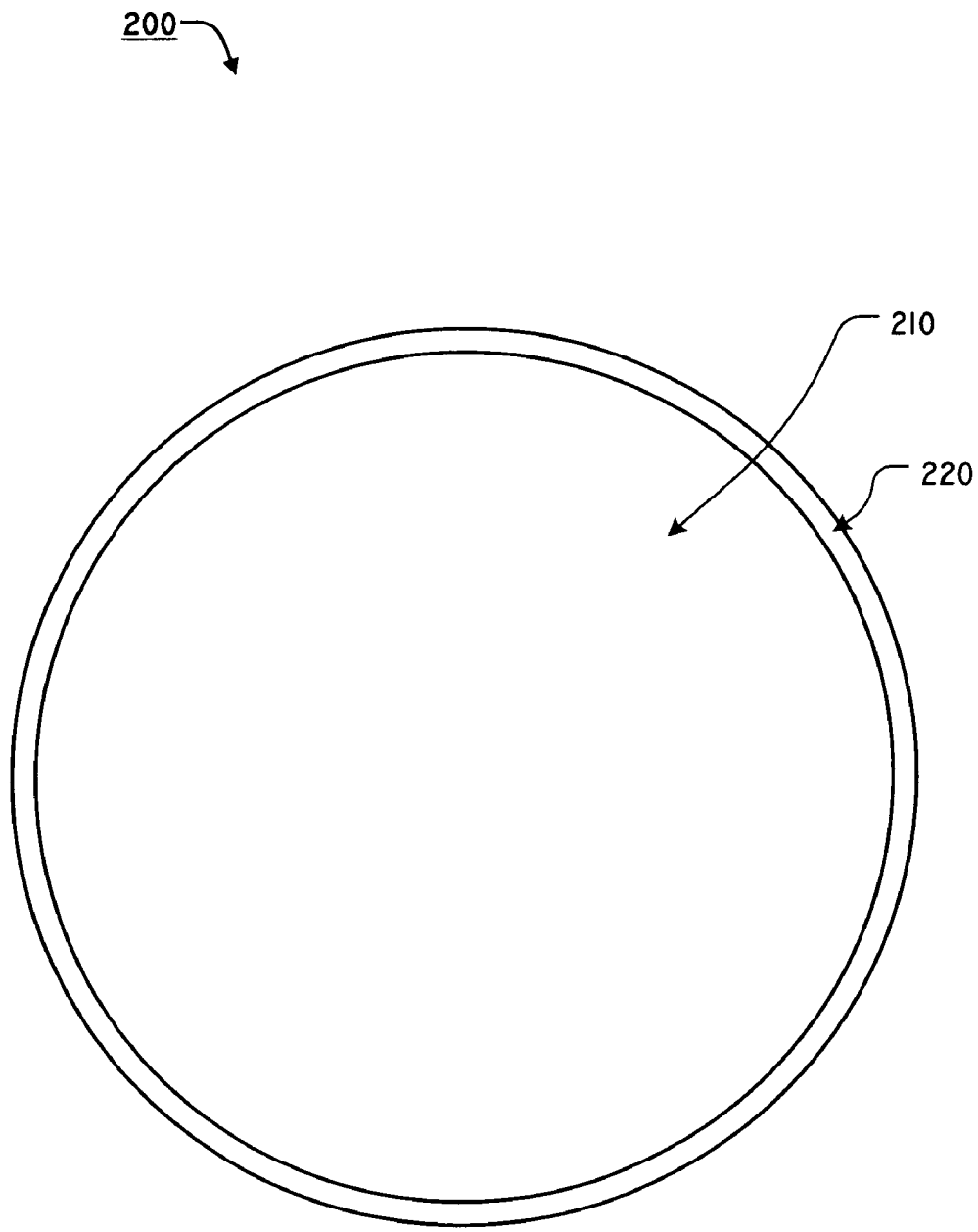
FIG. 10 shows a top view of a third exemplary embodiment of a collapsible cover according to this invention, wherein the collapsible cover does not include a center hole.

FIG. 10 shows a top view of a third exemplary embodiment of a collapsible cover 200 according to this invention. As shown in FIG. 10, the collapsible cover 200 includes at least some of a flexible panel 210 and a perimeter pocket 220. It should be appreciated that the collapsible cover 200 also includes at least some of a coilable frame member 230 (not shown), a flexible skirt 240 (not shown) an elastic portion 242 (not shown), and a strap 250 (not shown).

It should be understood that each of these elements corresponds to and operates similarly to the flexible panel 110, the perimeter pocket 120, the coilable frame member 130, the flexible skirt 140, the elastic portion 142, and the strap 150, as described above with reference to FIGS. 1–4. However, as shown in FIG. 10, the collapsible cover 200 fails to include a hole 112.

Figure 11:
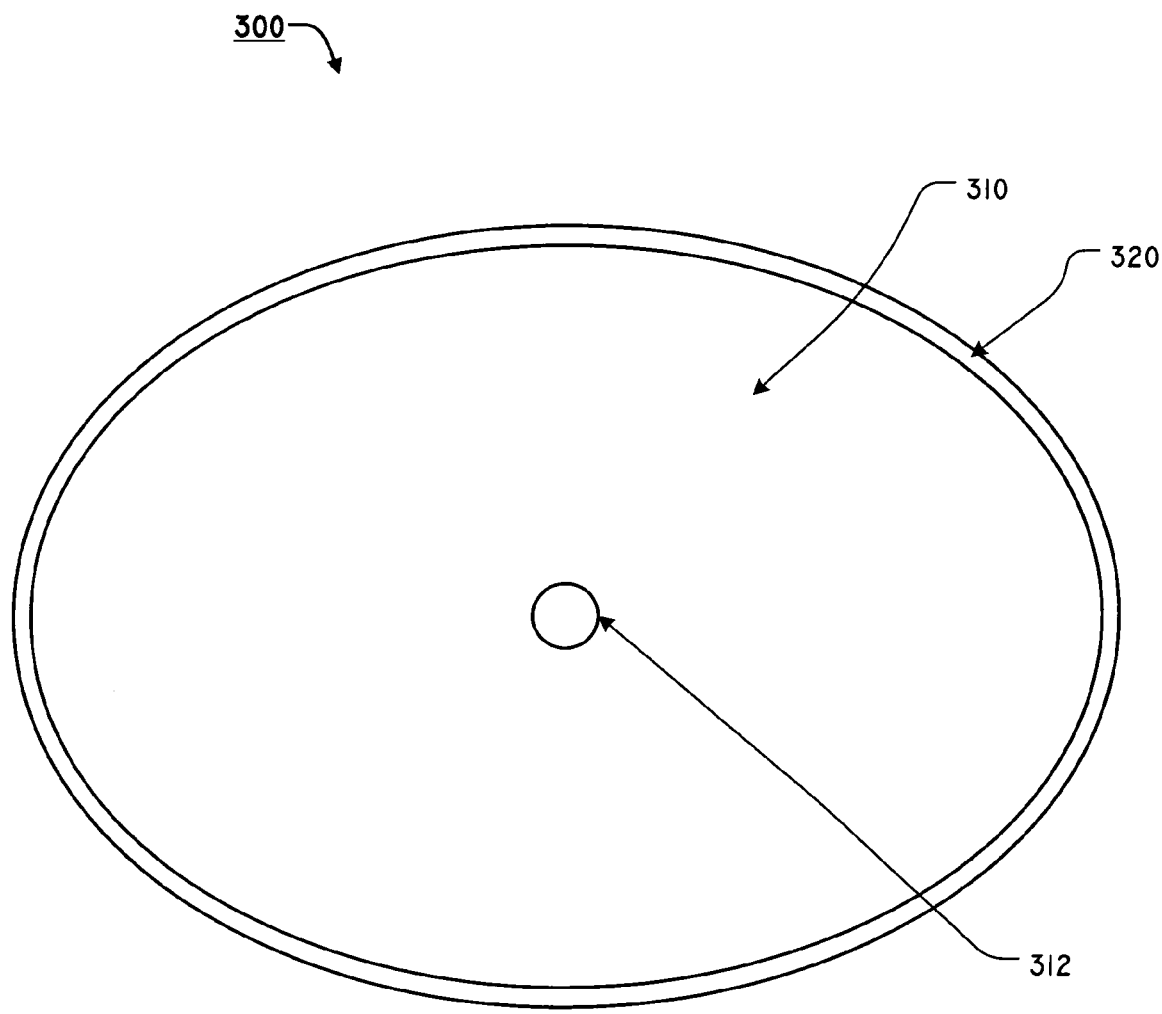
FIG. 11 shows a top view of a forth exemplary embodiment of a collapsible cover according to this invention, wherein the collapsible cover is in the general form of an ellipse.

FIG. 11 shows a top view of a forth exemplary embodiment of a collapsible cover 300 according to this invention. It should be appreciated that the basic elements of the collapsible cover 300 correspond to and operate similarly to the corresponding elements as described in FIGS. 1–7. However, as shown in FIG. 11, the overall or general shape of the collapsible cover 300 is that of an ellipse.

Figure 12:
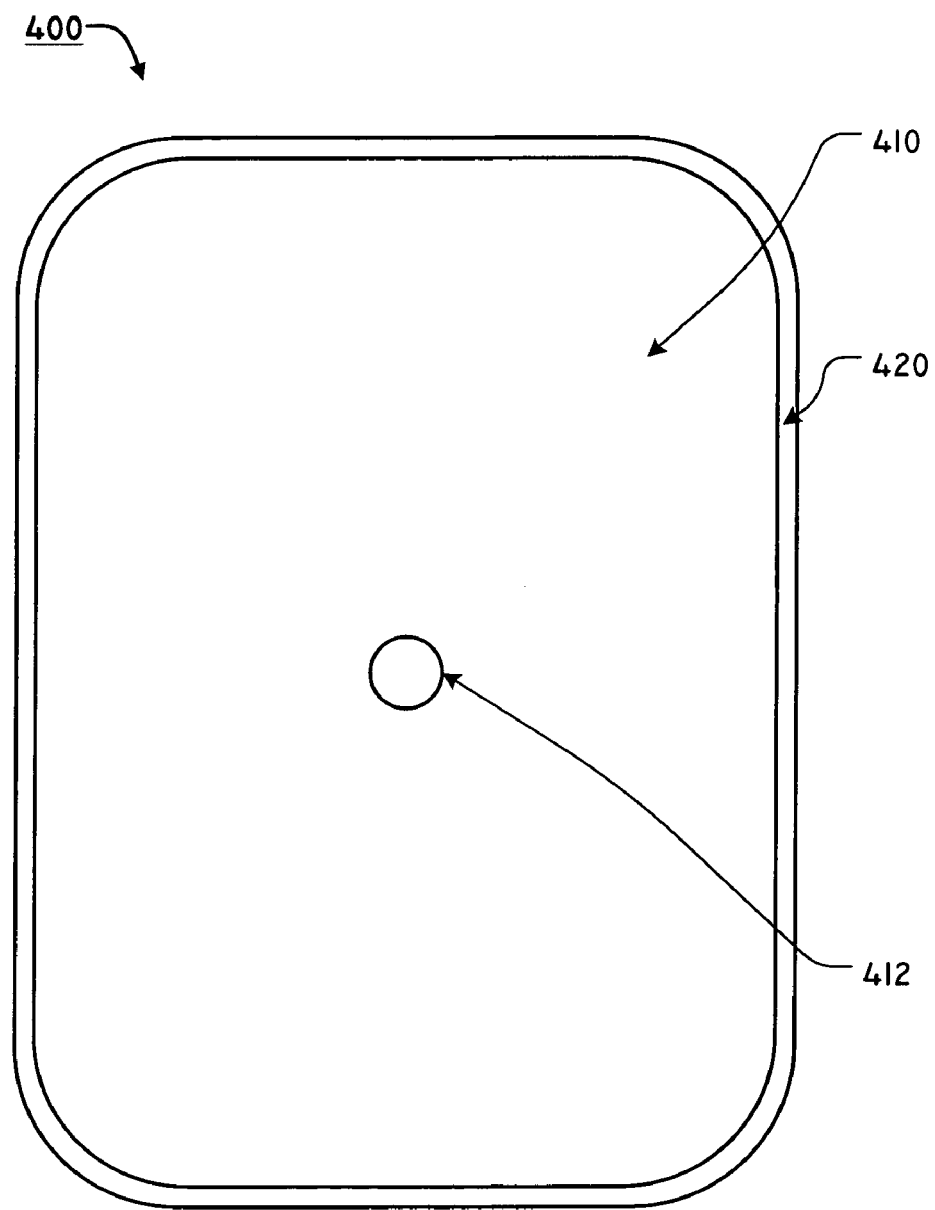
FIG. 12 shows a top view of a fifth exemplary embodiment of a collapsible cover according to this invention, wherein the collapsible cover is in the general form of a rounded rectangle.

FIG. 12 shows a top view of a fourth exemplary embodiment of a collapsible cover 400 according to this invention. It should be appreciated that the basic elements of the collapsible cover 400 correspond to and operate similarly to the corresponding elements as described in FIGS. 1–7. However, as shown in FIG. 12, the collapsible cover 400 is in the general form of a rounded rectangle.

Figure 13:
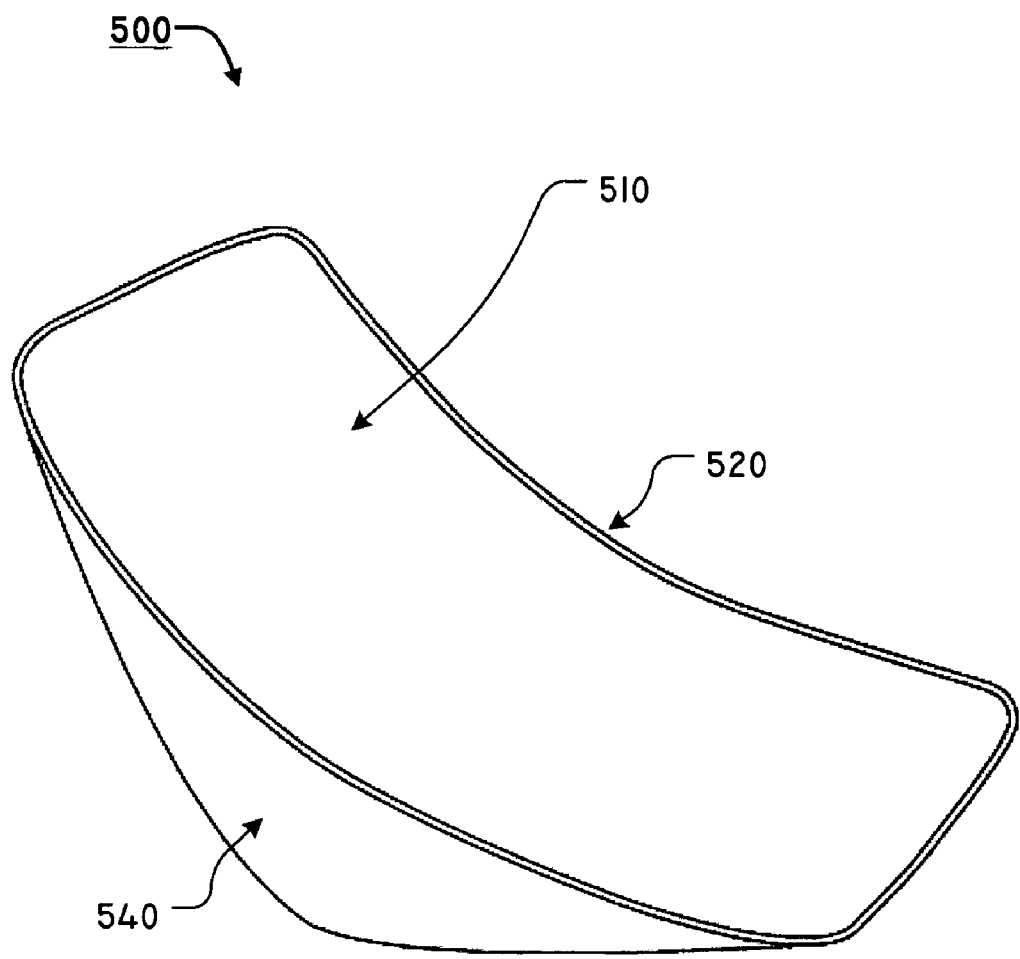
FIG. 13 shows a perspective view of a first exemplary embodiment of a collapsible chair cover according to this invention.

FIG. 13 shows a perspective view of a first exemplary embodiment of a collapsible chair cover 500 according to this invention. As shown in FIG. 13, the collapsible chair cover 500 includes at least some of a flexible panel 510, a perimeter pocket 520, and a flexible skirt 540. It should also be appreciated that the collapsible chair cover 500 also includes at least some of a coilable frame member 530 (not shown), and a strap 550 (not shown). It should further be appreciated that the collapsible chair cover 500 may also optionally include an elastic portion 542 (not shown).

As shown in FIG. 13, the flexible panel 510 includes a top side and a bottom side and is generally rectangular in nature. In various exemplary embodiments, the flexible panel 510 is made of strong, lightweight fabric or other material and may include woven fabrics, sheet fabrics, films, nylon, spandex, vinyl, PVC, neoprene, or the like. Additionally, the flexible panel 510 may be made of any flexible and/or elastic material and may stretch, such that the collapsible chair cover 500 is adaptable to different sizes and configurations and properly fits around a chair. Alternatively, the flexible panel 510 may be formed from multiple materials.

In various exemplary embodiments, the flexible panel 510 may include a cushion material, such that the collapsible chair cover 500 may provide an additional cushion to the item over which it is placed.

The fabric may be water-resistant and durable enough to withstand the wear and tear associated with a cover material that is appropriate for outdoor. It should be appreciated that the terms fabric and material are to be given their broadest meanings and that the particular fabric or material used to form the flexible panel 510 is a design choice based on the desired appearance and functionality of the collapsible chair cover 500.

A perimeter pocket 520 is formed substantially around a perimeter of the flexible panel 510 such that a coilable frame member 530 may be held or contained within the perimeter pocket 520. The coilable frame member 530 provides tension to the flexible panel 510 and holds the flexible panel 510 taut when the flexible panel 510 is in an expanded configuration and provides form to the flexible panel 510. The coilable frame member 530 may be merely held or retained within the perimeter pocket 520 without being connected thereto. Alternatively, the coilable frame member 530 may be mechanically fastened, joined, stitched, fused, or glued within the perimeter pocket 520, such that the coilable frame member 530 is retained it in a specific position relative to the perimeter pocket 520 or the collapsible chair cover 500.

In various exemplary embodiments, the coilable frame member 530 may comprise a single unitary element. Alternatively, the coilable frame member 530 may comprise at least one strip or segment of frame member material that is connected, mechanically fastened, joined, stitched, fused, glued, welded, or otherwise attached or adhered to form a continuous loop, as described above, with respect to FIG. 8.

The coilable frame member 530 may be formed of for example, spring steel. Thus, the coilable frame member 530 may have a memory such that the coilable frame member 530 will expand to its uncoiled configuration when not held in the coiled configuration. In this manner, the coilable frame member 530 is capable of being manipulated between two extreme configurations or orientations, a fully expanded or open configuration, as shown, for example, in FIG. 13, and a coiled or collapsed configuration, as shown, for example, in FIG. 21E.

The coilable frame member 530 may be coated with a layer of PVC to protect the coilable frame member 530 from corroding and rusting. Alternatively, the coilable frame member 530 may be formed from a coilable spring or any other material, such as, for example, plastic, which is relatively strong and sufficiently flexible to allow the coilable frame member 530 to be compressed and coiled. In various exemplary embodiments, the coilable frame member 530 may be formed from a waterproof or corrosion resistant material or from a material that has been treated such that it is resistant to water damage or corrosion.

A flexible skirt 540 is attached along an outer edge or the perimeter of the flexible panel 510, and extends generally downward or toward a center of the collapsible chair cover 500. In certain exemplary embodiments, the flexible skirt 540 extends from the entire outer edge or perimeter of the flexible panel 510. In certain other exemplary embodiments, the flexible skirt 540 extends from a portion of the outer edge or perimeter of the flexible panel 510.

In various exemplary embodiments, the flexible skirt 540 is made of strong, lightweight fabric or other material and may include woven fabrics, sheet fabrics, films, nylon, spandex, vinyl, PVC, neoprene, or the like. Additionally, the flexible skirt 540 may be made of any flexible and/or elastic material and may stretch, such that the collapsible chair cover 500 is adaptable to different sizes and configurations and properly fits around a chair. Alternatively, the flexible skirt 540 may be formed from multiple materials. In various exemplary embodiments, the flexible skirt 540 may include a cushion material.

The fabric may be water-resistant and durable enough to withstand the wear and tear associated with a cover material that is appropriate for outdoor. It should be appreciated that the terms fabric and material are to be given their broadest meanings and that the particular fabric or material used to form the flexible skirt 540 is a design choice based on the desired appearance and functionality of the collapsible chair cover 500.

As shown in FIG. 13, the flexible skirt 540 is attached along and extends generally downward from at least a portion of the perimeter of the flexible panel 510. However, so that the collapsible chair cover 500 is adaptable to different sizes and configurations and properly fits on an object of differing heights, such as, for example, a chair, the flexible skirt 540 extends different lengths from the flexible panel 510 at different points around the perimeter of the flexible panel 510. In this manner, when the collapsible chair cover 500 is placed over, for example, a lawn chair, the flexible skirt 540 wraps around a portion of the chair and holds or secures the collapsible chair cover 500 to the chair, as further shown in FIGS. 20A–20C.

The flexible skirt 540 may also include an elastic portion 542 that provides tension to the flexible skirt 540 and allows the flexible skirt 540 to hold or secure the collapsible chair cover 500 to a chair.

The strap 550 may be attached to the flexible panel 510, the perimeter pocket 520, or the flexible skirt 540. The strap 550 allows the collapsible chair cover 500 to be maintained in a folded or collapsed state, when it is folded or collapsed.

Figure 14A:
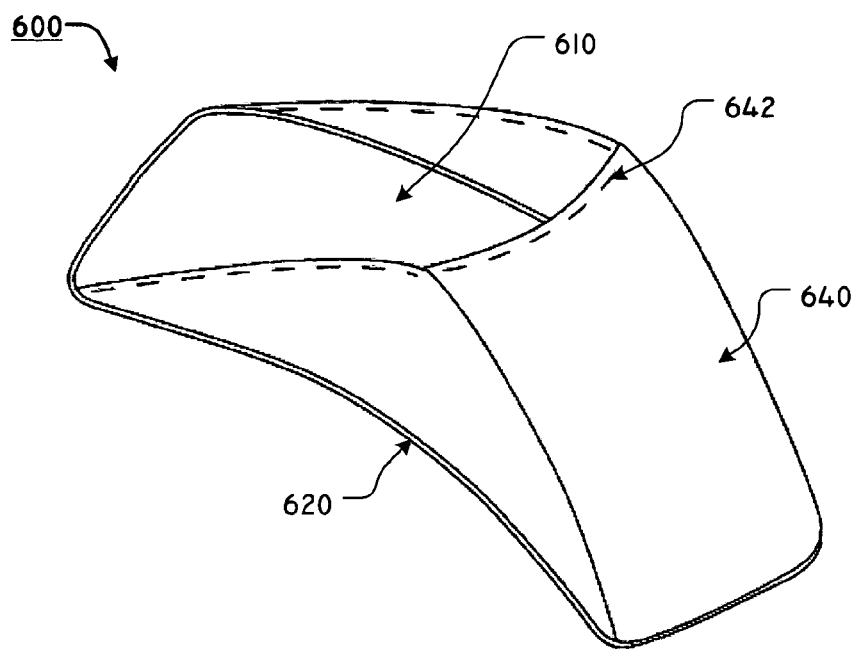
FIG. 14A shows a bottom perspective view of a second exemplary embodiment of a collapsible chair cover according to this invention.
Figure 14B:
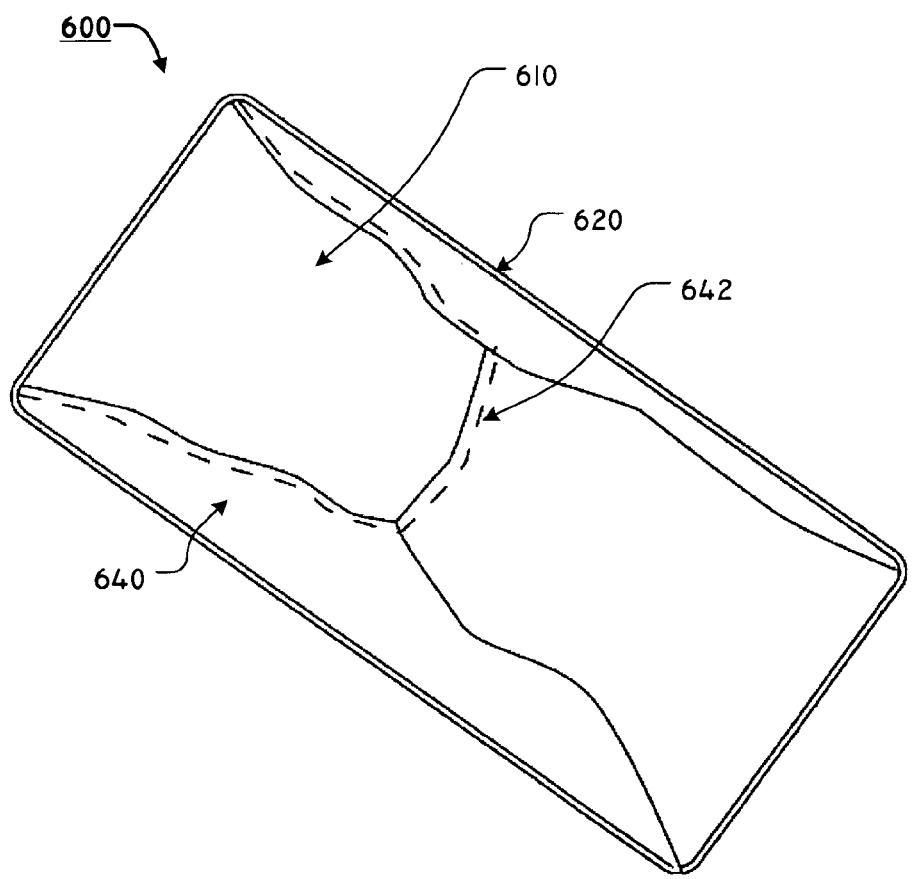
FIG. 14B shows a bottom view of the second exemplary embodiment of the collapsible chair cover according to this invention.

FIG. 14A shows a bottom perspective view of a second exemplary embodiment of a collapsible chair cover 600 while FIG. 14B shows a bottom view of the second exemplary embodiment of the collapsible chair cover 600. As shown in FIGS. 14A and 14B, the collapsible chair cover 600 includes at least some of a flexible panel 610, a perimeter pocket 620, a coilable frame member 630 (not shown), a flexible skirt 640, and an elastic portion 642. It should be appreciated that each of these elements correspond to and operate similarly to the corresponding elements as described above with respect to FIG. 13.

The elastic portion 642 is located in a lower portion of the flexible skirt 640, such that, when the collapsible chair cover 600 is placed over a chair, the elastic portion 642 provides a requisite amount of tension to the flexible skirt 640, such that the collapsible chair cover 600 is maintained atop the chair.

It should be appreciated that, in various exemplary embodiments, the elastic portion 642 may be included in the lower portion of the flexible skirt 640 and a lower portion of the flexible panel 610. In this manner, the elastic portion 642 may provide tension to the lower portion of the flexible skirt 640 and the lower portion of the flexible panel 610.

Figure 15A:
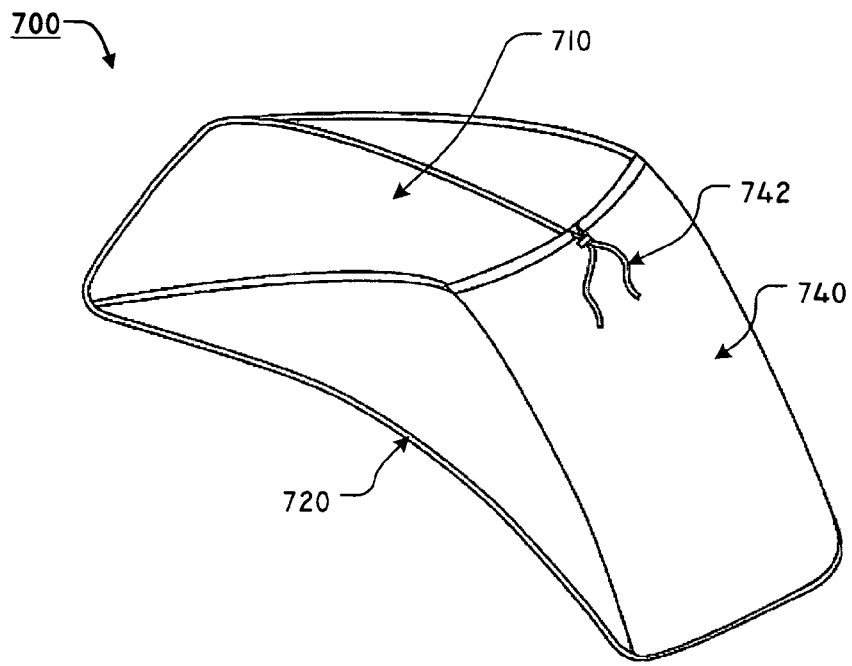
FIG. 15A shows a bottom perspective view of a third exemplary embodiment of a collapsible chair cover according to this invention.
Figure 15B:
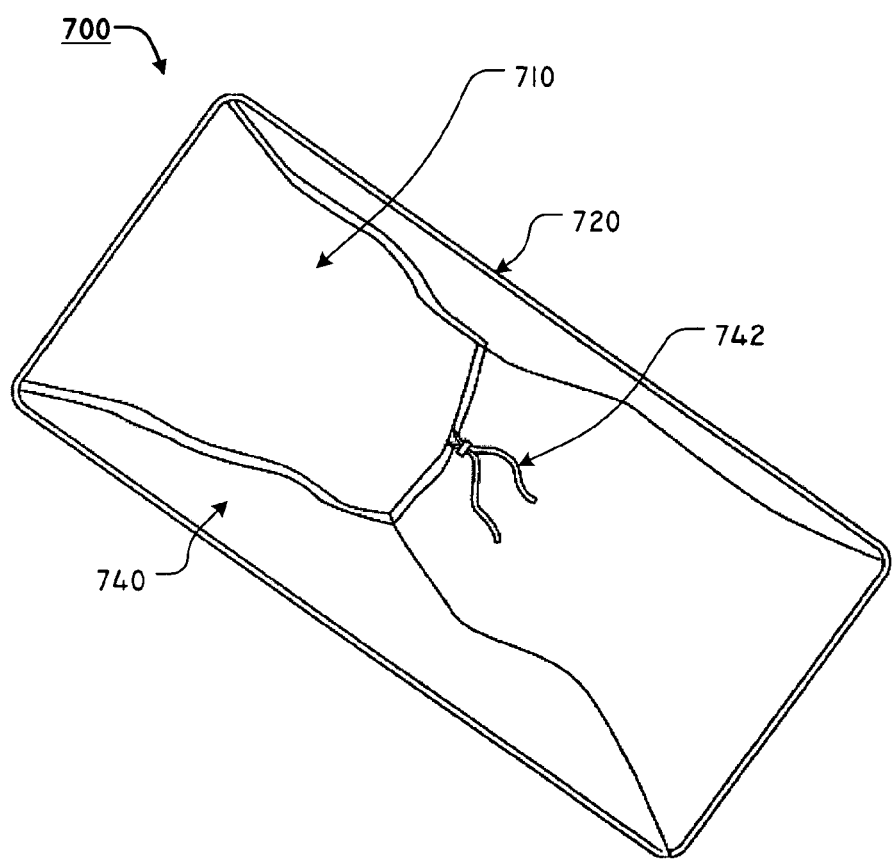
FIG. 15B shows a bottom view of the third exemplary embodiment of the collapsible chair cover according to this invention.

FIG. 15A shows a bottom perspective view of a third exemplary embodiment of a collapsible chair cover 700 while FIG. 15B shows a bottom view of the collapsible chair cover 700. As shown in FIGS. 15A and 15B, the collapsible chair cover 700 includes at least some of a flexible panel 710, a flexible skirt 740, a perimeter pocket 720, a coilable frame member 730 (not shown), and a flexible skirt tensioner 742.

It should be appreciated that each of these elements correspond to and operate similarly to the corresponding elements as described above with respect to FIG. 13 and FIGS. 14A and 14B.

However, as shown in FIGS. 15A and 15B, the elastic portion 642 of FIGS. 14A and 14B is replaced with a flexible skirt tensioner 742. In various exemplary embodiments, the flexible skirt tensioner 742 includes a cord which is anchored within a pocket formed in the flexible skirt 740, such that when the cord is drawn out of the pocket in the flexible skirt 740, tension is applied to the flexible skirt 740.

It should be appreciated, that in various exemplary embodiments, the flexible skirt tensioner 742 may include a cord, rope, yarn, or other material that is at least partially enclosed or concealed within the pocket in the flexible skirt 740, which may be used to adjustably provide tension to the flexible skirt 740.

It should also be appreciated that, in various exemplary embodiments, the flexible skirt tensioner 742 may be included in the lower portion of the flexible skirt 740 and a lower portion of the flexible panel 710. In this manner, the flexible skirt tensioner 742 may provide tension to the lower portion of the flexible skirt 740 and the lower portion of the flexible panel 710.

Figure 16:
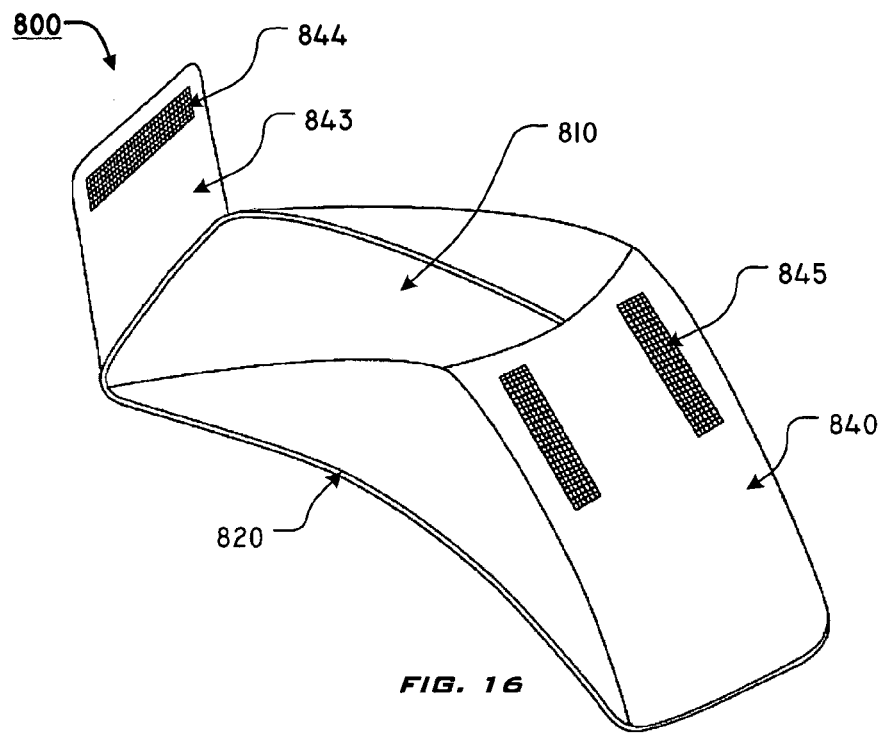
FIG. 16 shows a bottom perspective view of a fourth exemplary embodiment of a collapsible chair cover according to this invention.

FIG. 16 shows a bottom perspective view of a fourth exemplary embodiment of a collapsible chair cover 800 according to this invention. It should be appreciated that each of the elements of the collapsible chair cover 800 correspond to and operate similarly to the corresponding elements as described above with respect to FIG. 13.

However, as shown in FIG. 16, tension is maintained on the flexible skirt 840 by means of a flexible skirt flap 843 being releasably attached to the flexible skirt 840. As further shown in FIG. 16, the flexible skirt flap 843 is releasably attached to the flexible skirt 840 by means of a hook and loop fastener 844, such as Velcro®, being attached to the flexible skirt flap 843 and a length of corresponding hook and loop fastener material 845 being attached to the flexible skirt 840.

Figure 17:
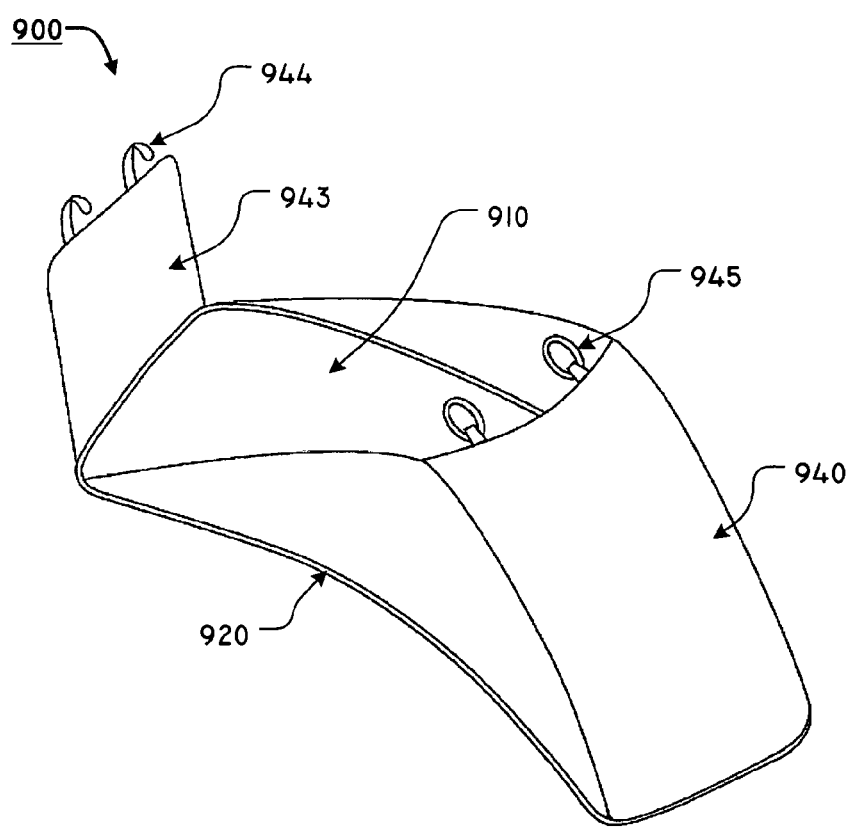
FIG. 17 shows a bottom perspective view of a fifth exemplary embodiment of a collapsible chair cover according to this invention.

FIG. 17 shows a bottom perspective view of a fifth exemplary embodiment of a collapsible chair cover 900 according to this invention. It should be appreciated that each of the elements of the collapsible chair cover 900 correspond to and operate similarly to the corresponding elements as described above with respect to FIG. 13 and/or FIG. 16.

However, as shown in FIG. 17, the hook and loop fastener material 844 and 845, of the collapsible chair cover 800 of FIG. 16, is replaced with a length of strap material 944 and a corresponding buckle 945.

It should be appreciated that in various exemplary embodiments, the strap material 944 may be comprised of a length of fabric or other material with a corresponding or complimentary fastening means or buckle 945 attached to the flexible skirt 940. In this manner, the strap material 944 may be adjusted such that the collapsible chair cover 900 adaptable to different sizes and configurations and properly fits around a chair.

It should be appreciated that in various exemplary embodiments, the strap material 944 and the buckle 945 may be replaced by any fastening means, or releasable fastener, such as, for example, releasable fasteners such as male/female snap release buckles, Velcro® or other hook and loop fasteners, buttons, snaps, snap-hooks, adjuster bars, slides, cord locks, zipper pulls, modular buckles, or other fastening or closure means known to those skilled in the art, which are capable of connecting or coupling the flexible skirt flap 943 to the flexible skirt 940.

Figure 18:
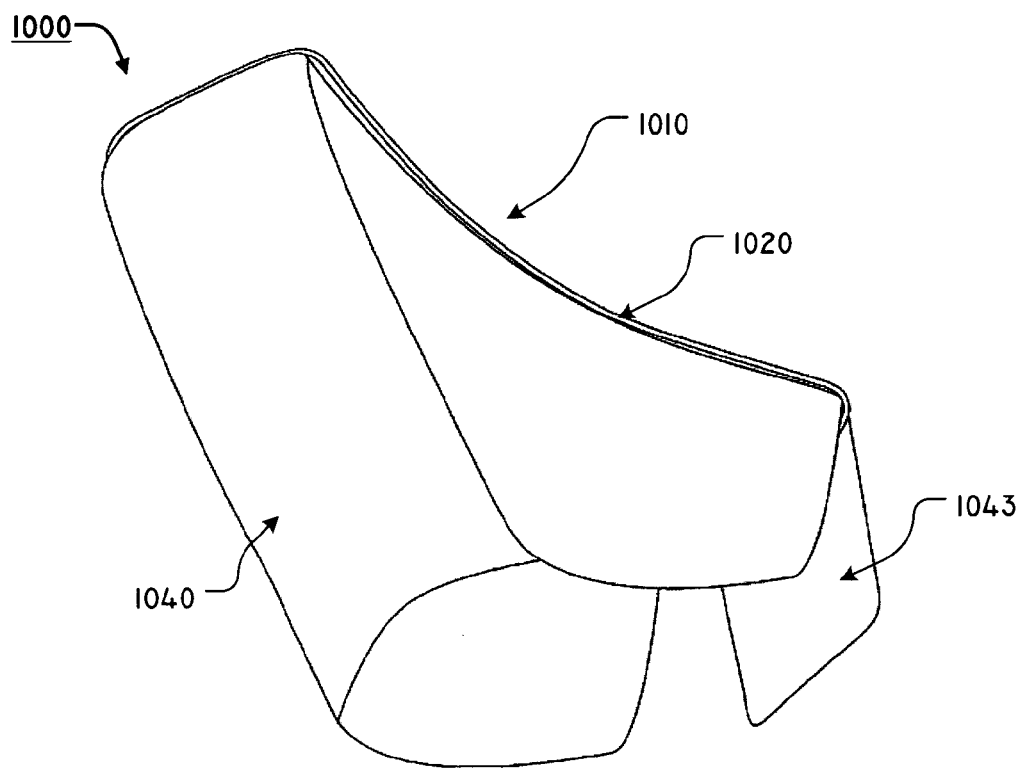
FIG. 18 shows a bottom perspective view of a sixth exemplary embodiment of a collapsible chair cover according to this invention.

FIG. 18 shows a bottom perspective view of a sixth exemplary embodiment of a collapsible chair cover 1000 according to this invention. It should be appreciated that each of the elements of the collapsible chair cover 1000 correspond to and operate similarly to the corresponding elements as described above with respect to FIG. 13.

However, as shown in FIG. 18, the collapsible chair cover 1000 includes a somewhat extended flexible skirt 1040 and flexible skirt flap 1043. In the various exemplary embodiments of the collapsible chair cover 1000, the flexible skirt 1040 and flexible skirt flap 1043 may be tucked, for example, under existing cushions on a chair and held in place be the existing cushions.

Figure 19:
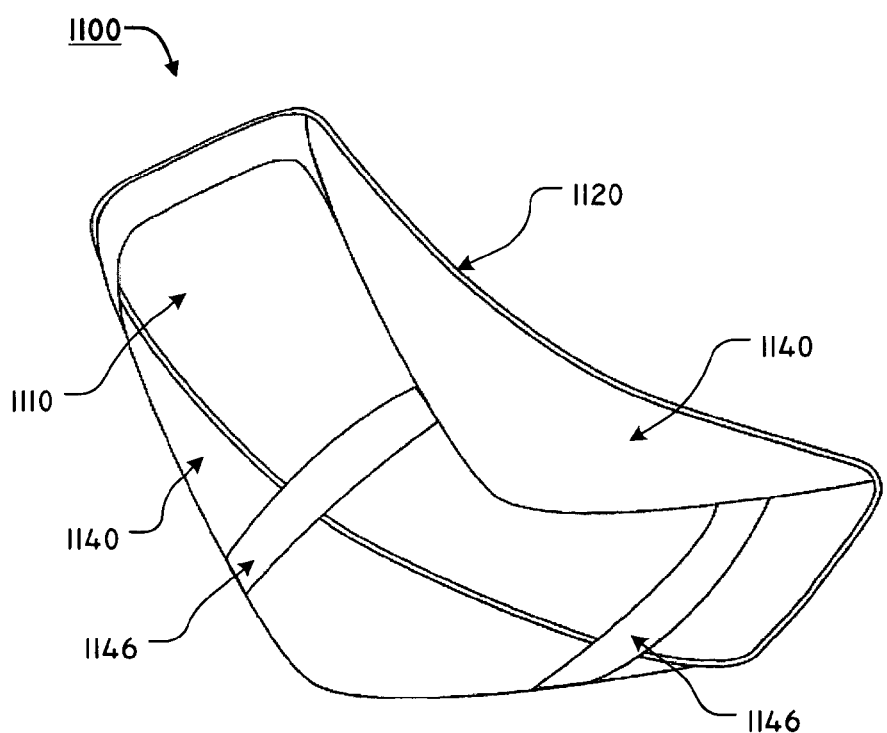
FIG. 19 shows a bottom perspective view of a seventh exemplary embodiment of a collapsible chair cover according to this invention.

FIG. 19 shows a bottom perspective view of a seventh exemplary embodiment of a collapsible chair cover 1100 according to this invention. It should be appreciated that each of the elements of the collapsible chair cover 1000 correspond to and operate similarly to the corresponding elements as described above with respect to FIG. 13.

However, as shown in FIG. 19, the collapsible chair cover 1100 includes at least one skirt strap 1146, which attaches opposing sides of the flexible skirt 1140. It should be appreciated that in various exemplary embodiments, the skirt strap 1146 is made of an elastic or flexible material such that, when placed around a chair, the skirt strap 1146 provides tension to the flexible skirt 1140, and holds the collapsible chair cover 1100 in place.

Figure 20A:
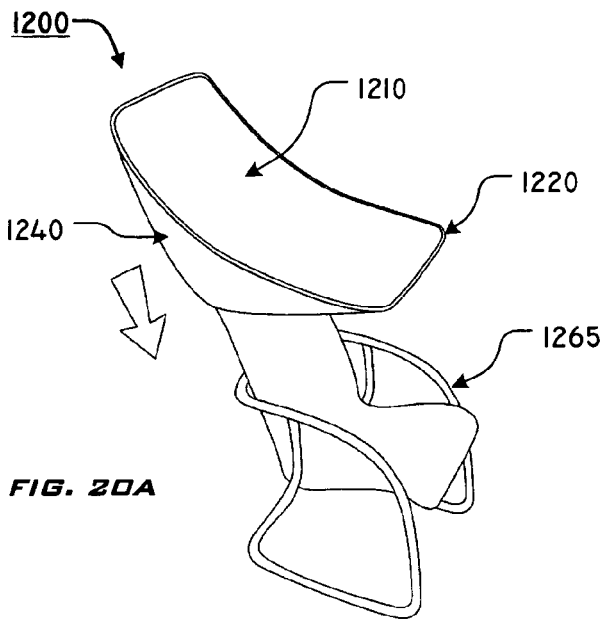
FIGS. 20A–20C show a perspective view of an exemplary embodiment of the collapsible chair cover being fitted on a chair according to this invention.
Figure 20B:
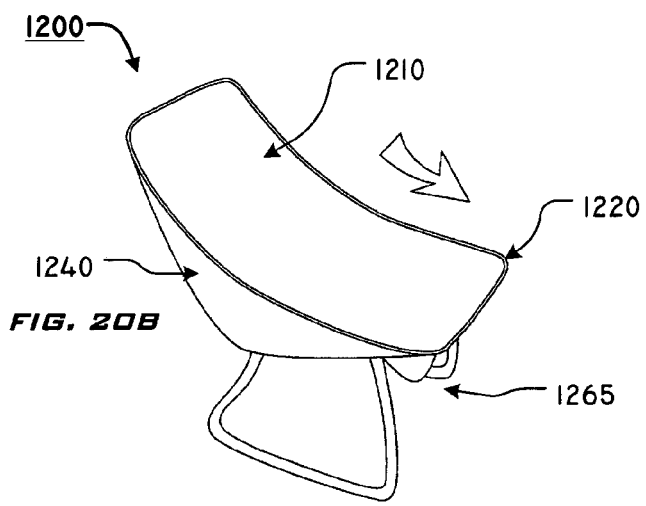
Figure 20C:
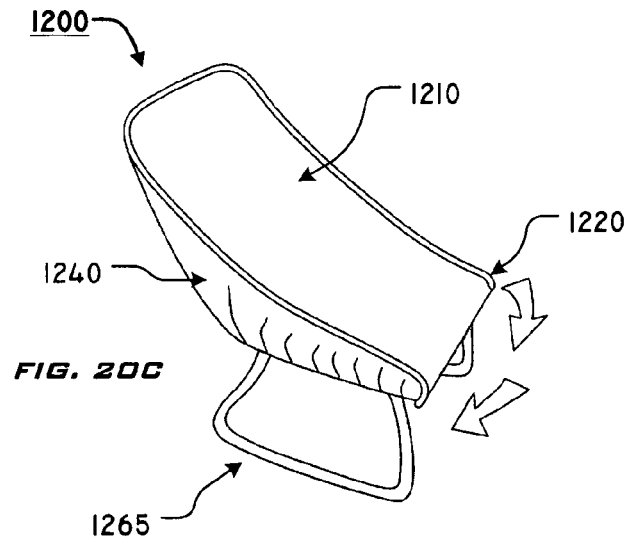

FIGS. 20A–20C show a perspective view of an exemplary embodiment of the collapsible chair cover 1200 being fitted on a chair according to this invention. It should be appreciated that the collapsible chair cover 1200 may include any of the features and/or embodiments of the collapsible chair cover 500, 600, 700, 800, 900, 1000, and/or 1100, as described above with respect to FIGS. 13–19.

Figure 21A:
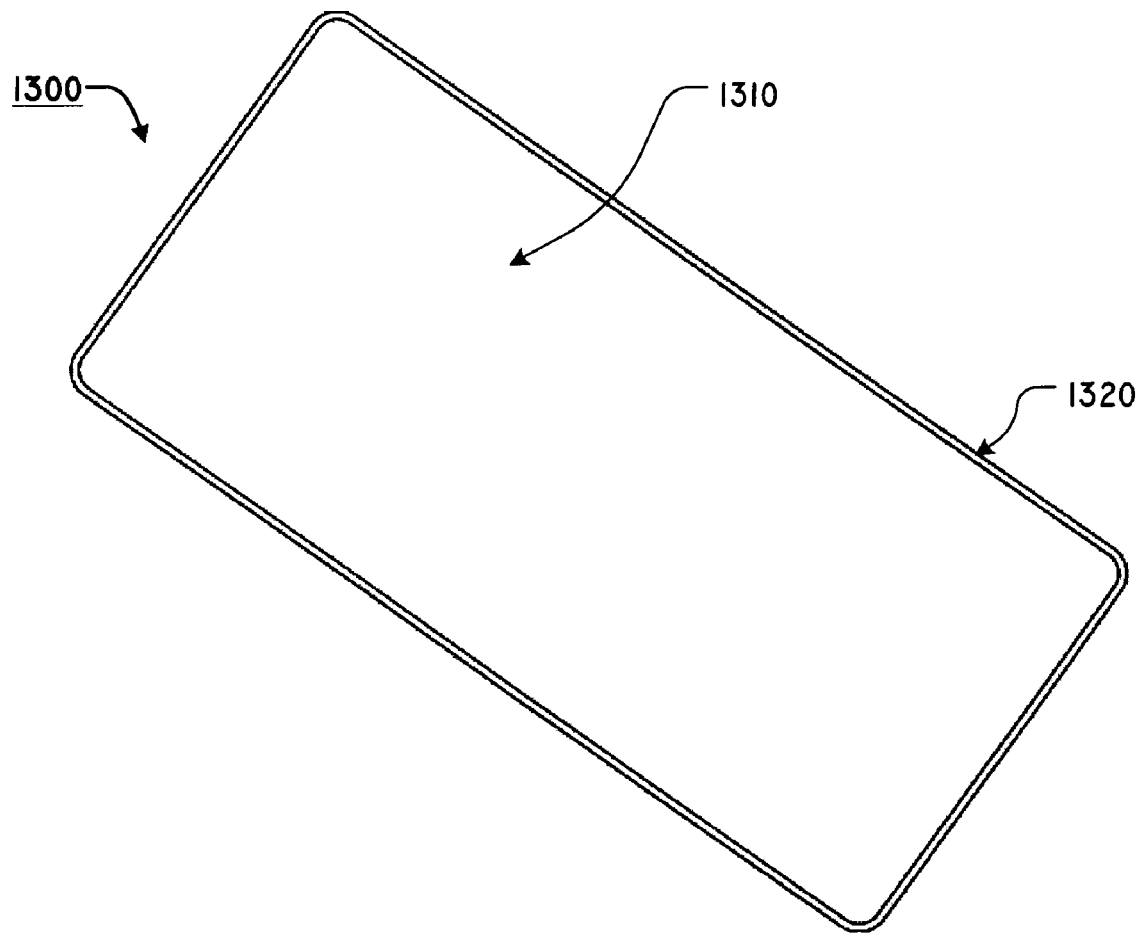
FIGS. 21A–21E show an exemplary embodiment of the collapsible chair cover as it transitions from a fully expanded or open configuration to a coiled or collapsed configuration according to this invention.
Figure 21B:
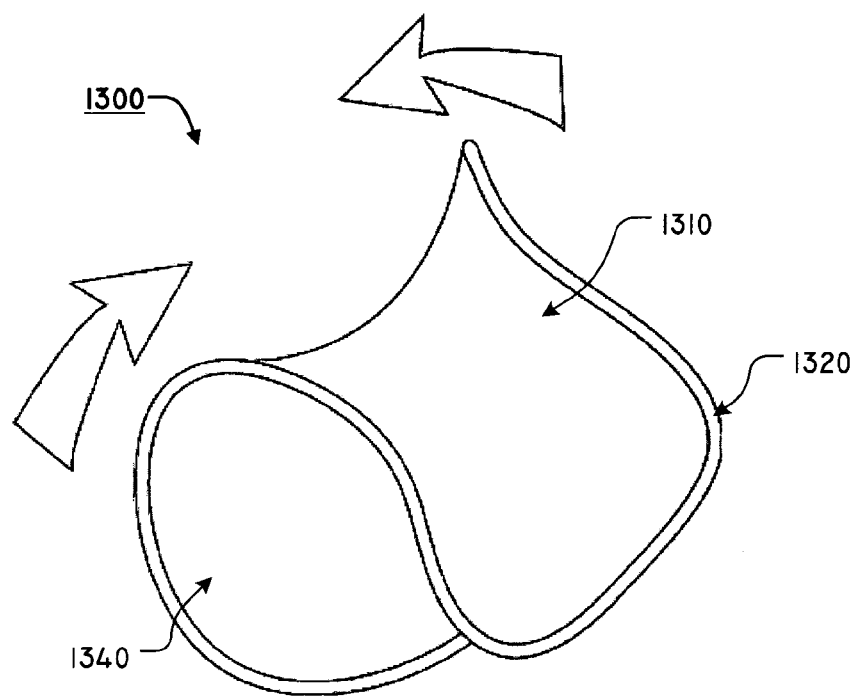
Figure 21C:
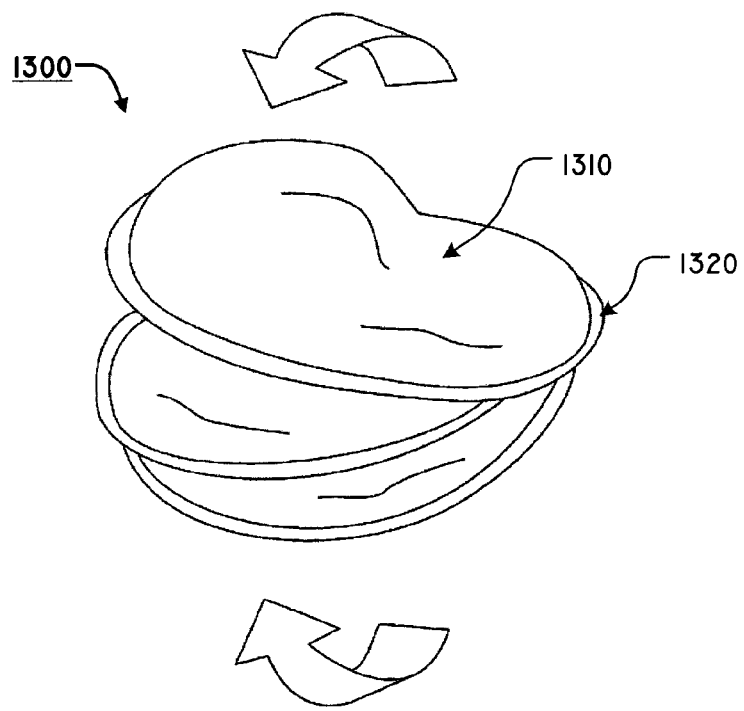
Figure 21D:
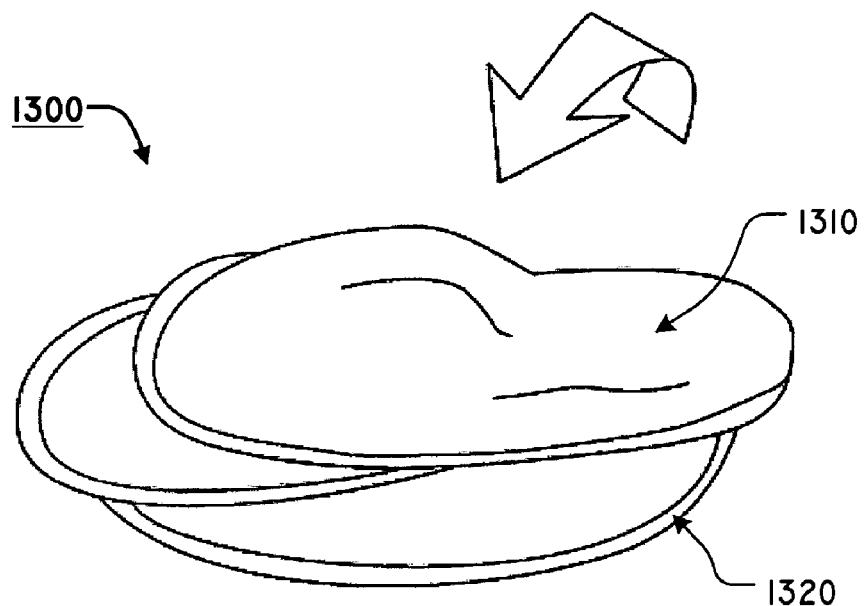
Figure 21E:
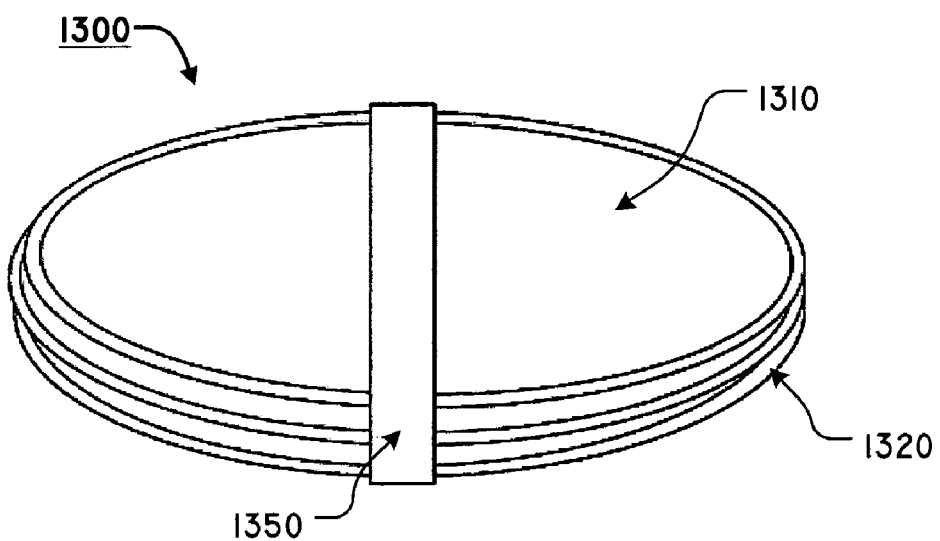

FIGS. 21A–21E illustrate the various steps, in ascending order, according to an embodiment of this invention, by which a collapsible chair cover 1300 may be transitioned from a fully expanded or open configuration, as shown, for example, in FIG. 21A, to a fully coiled or collapsed configuration, as shown, for example, in FIG. 21E. It should be understood that the collapsible chair cover 1300 may include any of the features and/or embodiments of the collapsible chair cover 500, 600, 700, 800, 900, 1000, and/or 1100, as described above with respect to FIGS. 13–19.

Although FIGS. 21A–21E show the transition of an exemplary embodiment of a collapsible chair cover 1300, the explanation of the transition of a chair cover is merely for simplicity and efficiency. It should be appreciated that the basic transition method, as shown and described, may be used to transition any of the various exemplary embodiments of a collapsible cover according to this invention. Furthermore, it should also appreciated that certain of the various exemplary embodiments of a collapsible cover may require additional or less steps to transition from a fully expanded or open configuration to a coiled or collapsed configuration.

Beginning in FIG. 21A, the flexible skirt 1340 (not shown) is oriented on the bottom side of the collapsible cover 1300. Then, as shown in FIG. 21B, two generally opposing sides of the collapsible cover 1300 are folded towards one another. Next, the coilable frame member 1330 (not shown) is twisted and folded at least once such that multiple loops are formed by the coilable frame member 1330 and the collapsible cover 1300 is collapsed into a smaller shape, as shown in FIG. 21C.

Then, as shown in FIG. 21D, the collapsible cover 1300 is further collapsed to achieve a smaller configuration having a plurality of substantially adjacent, connected circles formed from the twisted and folded coilable frame member 1330.

Next, as shown in FIG. 21E, the coilable frame member 1330 and the collapsible cover 1300 is fully coiled or collapsed, such that collapsible cover 1300 has a size that is a fraction of the size of the fully expanded or open collapsible cover 1300. As further shown in FIG. 21E, the strap 1350 may be placed around the multiple loops of the fully coiled or collapsed collapsible cover 1300 to provide sufficient tension on the coilable frame member 1330 to maintain the collapsible cover 1300 in the fully coiled or collapsed configuration.

It should be appreciated that the process may be reversed to illustrate the steps of transitioning the collapsible cover 1300 from a fully coiled or collapsed configuration to a fully expanded or open configuration, by following FIGS. 21A–21E in reverse order.

Figure 22:
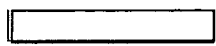
FIG. 22 shows a top view of various alternative exemplary embodiments of a collapsible cover according to this invention.
Figure 22:
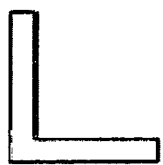
Figure 22:
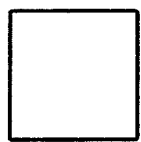
Figure 22:
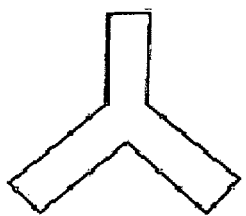
Figure 22:
Figure 22:
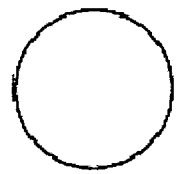
Figure 22:
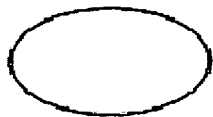

FIG. 22 shows a top view of various alternative exemplary general shapes of the collapsible cover according to this invention. It should be appreciated that although the collapsible cover is shown and/or described as having certain exemplary overall geometries, these geometries are intended to be illustrative, not limiting. Thus, in various exemplary embodiments contemplated by this invention, the collapsible cover (100, 200, 300, or 400) or the collapsible chair cover (500, 600, 700, 800, 900, 1000, 1100, or 1300) may comprise any geometry, including, for example, a generally square, rectangle, triangular, pentangular, circular, elliptical, star, or other shape. Therefore, a collapsible cover may be formed to provide a protective cover for any given item or object, such as, for example, an outdoor or picnic table, a chair, a grill, a bicycle, or any other indoor or outdoor item that may benefit from being covered and protected from damage.

While this invention has been described in conjunction with the exemplary embodiments outlined above, it is evident that many alternatives, modifications, and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A collapsible cover, comprising:
   a flexible panel;
   a perimeter pocket formed substantially around a perimeter of the flexible panel;
   a coilable frame member held or contained within the perimeter pocket, wherein the coilable frame member is capable of being manipulated between an expanded configuration and a collapsed configuration; and
   a flexible skirt fixedly coupled substantially along the perimeter of the flexible panel, such that when the collapsible cover is placed over an item, the flexible skirt at least partially secures the collapsible cover on the item.

2. The collapsible cover of claim 1, wherein the flexible panel comprises woven fabrics, sheet fabrics, films, nylon, spandex, vinyl, PVC, neoprene, or an equivalent.

3. The collapsible cover of claim 1, wherein the flexible panel comprises a flexible and/or elastic material.

4. The collapsible cover of claim 1, wherein the flexible panel comprises multiple materials.

5. The collapsible cover of claim 1, wherein the flexible panel comprises a cushion material.

6. The collapsible cover of claim 1, wherein the coilable frame member is mechanically fastened, joined, stitched, fused, or glued within the perimeter pocket.

7. The collapsible cover of claim 1, wherein the coilable frame member comprises a unitary element.

8. The collapsible cover of claim 1, wherein the coilable frame member comprises at least one strip or segment of frame member material connected to form a continuous loop.

9. The collapsible cover of claim 1, wherein the coilable frame member comprises spring steel.

10. The collapsible cover of claim 1, wherein the coilable frame member comprises a corrosion resistant material.

11. The collapsible cover of claim 1, wherein the coilable frame member comprises at least one of plastic, fiberglass, Polyvinyl Chloride, nylon, or its equivalent.

12. The collapsible cover of claim 1, wherein the coilable frame member is treated such that it is corrosion resistant.

13. The collapsible cover of claim 1, wherein the flexible skirt extends generally toward the center of the collapsible cover.

14. The collapsible cover of claim 1, wherein the flexible skirt comprises woven fabrics, sheet fabrics, films, nylon, spandex, vinyl, PVC, neoprene, or an equivalent.

15. The collapsible cover of claim 1, wherein the flexible skirt comprises a flexible and/or elastic material.

16. The collapsible cover of claim 1, wherein the flexible skirt comprises multiple materials.

17. The collapsible cover of claim 1, wherein the flexible skirt comprises a cushion material.

18. The collapsible cover of claim 1, wherein the flexible skirt includes an elastic portion that provides tension to the flexible skirt.

19. The collapsible cover of claim 1, wherein the coilable frame member comprises a continuous loop or band of material.

20. The collapsible cover of claim 1, wherein the coilable frame member comprises at least one strip or segment of material connected, mechanically fastened, joined, stitched, fused, glued, welded, attached, or adhered to form a continuous loop.

21. The collapsible cover of claim 1, wherein the coilable frame member comprises at least one strip or segment of material that is joined by a coilable frame member joining means to form a continuous loop.

22. The collapsible cover of claim 1, wherein the collapsible cover includes a strap that allows the collapsible cover to be maintained in a collapsed state, when it is collapsed.

23. The collapsible cover of claim 1, wherein the collapsible cover includes a hole formed in an approximate center of the collapsible cover.

24. The collapsible cover of claim 23, wherein the hole is surrounded by a hole reinforcement.

25. The collapsible cover of claim 23, wherein the collapsible cover includes a protective sleeve extending from the hole.

26. The collapsible cover of claim 25, wherein the protective sleeve extends generally downward from the hole.

27. The collapsible cover of claim 25, wherein the protective sleeve extends generally upward from the hole.

28. The collapsible cover of claim 25, wherein the protective sleeve includes an elastic portion that provides tension to the protective sleeve.

29. A collapsible cover, comprising:
   a flexible panel;
   a perimeter pocket formed substantially around a perimeter of the flexible panel;
   a coilable frame member held or contained within the perimeter pocket, the coilable frame member being capable of being manipulated between an expanded configuration and a collapsed configuration; and a flexible skirt fixedly coupled to and extending from at least a portion of the perimeter of the flexible panel, the flexible skirt extending generally downward from the flexible panel the flexible skirt extending different lengths from the flexible panel at different points around the perimeter of the flexible panel.

30. The collapsible cover of claim 29, further including a flexible skirt flap attached along at least a portion of a perimeter of the flexible panel, wherein the flexible skirt flap extends generally downward from the collapsible cover, and wherein the flexible skirt flap includes at least one releasable attachment that allows the flexible skirt flap to be releasably attached to the flexible skirt, such that when the collapsible cover is placed over an item, the flexible skirt and the flexible skirt flap may be releasably attached to at least partially secures the collapsible cover on the item.

* * * * *